(12) United States Patent
Nakagawa et al.

(10) Patent No.: US 10,890,512 B2
(45) Date of Patent: Jan. 12, 2021

(54) TIRE GRIPPING DEVICE AND TIRE INSPECTION METHOD

(71) Applicant: The Yokohama Rubber Co., LTD., Tokyo (JP)

(72) Inventors: Keiji Nakagawa, Okazaki (JP); Hirofumi Matsuo, Okazaki (JP); Michihiko Yoshimura, Okazaki (JP); Shonosuke Motomiya, Hiratsuka (JP)

(73) Assignee: The Yokohama Rubber Co., LTD.

( * ) Notice: Subject to any disclaimer, the term of this patent is extended or adjusted under 35 U.S.C. 154(b) by 45 days.

(21) Appl. No.: 15/546,638

(22) PCT Filed: Jan. 19, 2016

(86) PCT No.: PCT/JP2016/051363
§ 371 (c)(1),
(2) Date: Jul. 26, 2017

(87) PCT Pub. No.: WO2016/125576
PCT Pub. Date: Aug. 11, 2016

(65) Prior Publication Data
US 2018/0045609 A1    Feb. 15, 2018

(30) Foreign Application Priority Data

Feb. 2, 2015    (JP) ................................. 2015-018882

(51) Int. Cl.
*G01M 17/02*    (2006.01)
*B29D 30/06*    (2006.01)
(Continued)

(52) U.S. Cl.
CPC ....... *G01M 17/021* (2013.01); *B29D 30/0016* (2013.01); *B29D 30/06* (2013.01);
(Continued)

(58) Field of Classification Search
CPC ............ G01M 17/021; B29D 30/0016; B29D 31/06; B66C 1/422; B66C 1/427
(Continued)

(56) References Cited

U.S. PATENT DOCUMENTS 1,352,601 A * 9/1920 Hawkinson ........... B60C 25/142
254/50.2
1,352,807 A * 9/1920 Hawkinson ........... B60C 25/142
254/50.2
(Continued)

FOREIGN PATENT DOCUMENTS

CN    103660333    3/2014
DE    2 209 931    9/1973
(Continued)

OTHER PUBLICATIONS

Translation of JP2005199466A, retrieved from Espacenet on Aug. 27, 2020 (Year: 2005).*
(Continued)

*Primary Examiner* — David B. Thomas
*Assistant Examiner* — Thomas Raymond Rodgers
(74) *Attorney, Agent, or Firm* — Thorpe North & Western

(57) ABSTRACT

A tire gripping device includes a chuck mechanism having a pair of chuck portions adjacent in a width direction of a tire and contact members disposed on each of the chuck portions in a circumferential manner. The contact members are able to be brought into contact with an open end portion of a bead portion of the tire. The contact members are able to enter a state of allowing relative movement with a contact surface of an open end portion in a first contact stage and enter a state of non-relative movement with the contact surface in a second contact stage subsequent to the first contact stage. The tire gripping device further includes a first driving mechanism for moving the contact members in a radial
(Continued)

direction of the tire and a second driving mechanism for moving the pair of chuck portions in the width direction of the tire.

20 Claims, 18 Drawing Sheets

(51) Int. Cl.
  B29D 30/00 (2006.01)
  B66C 1/42 (2006.01)
(52) U.S. Cl.
  CPC .............. G01M 17/02 (2013.01); B66C 1/422 (2013.01); B66C 1/427 (2013.01); G01M 17/027 (2013.01)
(58) Field of Classification Search
  USPC .............. 157/15; 254/50; 269/221; 156/128; 15/128.1
  See application file for complete search history.

(56) References Cited

U.S. PATENT DOCUMENTS

| | | | | |
|---|---|---|---|---|
| 1,713,511 | A * | 5/1929 | Cadwallader | B60C 25/142 254/50.2 |
| 1,908,311 | A * | 5/1933 | Branick | B60C 25/142 254/50.3 |
| 2,250,740 | A * | 7/1941 | Anderson | B60C 25/132 254/50.2 |
| 2,895,711 | A * | 7/1959 | Branick | B60C 25/00 254/50.3 |
| 2,939,678 | A * | 6/1960 | Branick | B29D 30/64 254/50.3 |
| 3,005,619 | A * | 10/1961 | Bowen | B29D 30/64 242/575.5 |
| 3,043,565 | A * | 7/1962 | Sornsen | B29D 30/64 254/50.4 |
| 3,157,387 | A * | 11/1964 | Pinter | B60C 25/142 254/50.3 |
| 3,568,978 | A * | 3/1971 | Larson | B29D 30/64 157/13 |
| 3,583,674 | A * | 6/1971 | Hall | B60C 25/142 254/50.2 |
| 4,042,231 | A * | 8/1977 | Kopczynski | B23K 37/0531 269/48.1 |
| 4,125,639 | A * | 11/1978 | Brandl | B05B 13/0645 427/233 |
| 4,236,883 | A | 12/1980 | Turk et al. | |
| 4,693,431 | A * | 9/1987 | Kataoka | B65H 18/106 242/413.1 |
| 4,768,764 | A * | 9/1988 | Cole | B25B 5/06 269/118 |
| 4,874,303 | A | 10/1989 | Ichikawa et al. | |
| 4,950,142 | A * | 8/1990 | Katayama | B29D 30/0603 425/32 |
| 5,013,010 | A * | 5/1991 | Steffel | B60C 25/142 254/50.2 |
| 5,460,036 | A * | 10/1995 | Church | B60C 25/142 254/50.3 |
| 6,615,649 | B1 * | 9/2003 | Kokubu | B29D 30/0016 157/1.17 |
| 6,934,018 | B2 * | 8/2005 | Shaw | G01B 11/162 356/237.2 |
| 8,939,486 | B2 * | 1/2015 | Gorham | B25J 15/10 294/93 |
| 2003/0024626 | A1 * | 2/2003 | Byerley | B29D 30/246 156/110.1 |
| 2003/0168144 | A1 * | 9/2003 | Weaver | B29D 30/245 152/415 |
| 2007/0170620 | A1 * | 7/2007 | Yoshino | B29D 30/0662 264/326 |
| 2008/0066532 | A1 * | 3/2008 | Shaw | G01M 17/027 73/146 |
| 2008/0105358 | A1 | 5/2008 | Serdarevic et al. | |
| 2011/0119918 | A1 | 5/2011 | Serdarevic et al. | |
| 2012/0145329 | A1 * | 6/2012 | Stoila | B29D 30/0016 156/394.1 |
| 2013/0128029 | A1 * | 5/2013 | Leobal | G01M 17/021 348/128 |
| 2014/0069573 | A1 | 3/2014 | Delgado et al. | |
| 2014/0373614 | A1 * | 12/2014 | Steinbichler | G01M 17/027 73/146 |
| 2015/0165704 | A1 * | 6/2015 | Thalgott, Jr. | B29D 30/0016 294/93 |
| 2016/0031172 | A1 * | 2/2016 | Ichinose | B29D 30/0016 264/315 |
| 2016/0075196 | A1 * | 3/2016 | Corghi | B60C 25/056 157/1.24 |
| 2016/0231202 | A1 * | 8/2016 | Charlat | G01M 17/021 |
| 2017/0160079 | A1 * | 6/2017 | Takebuchi | G01B 11/24 |

FOREIGN PATENT DOCUMENTS

| | | | |
|---|---|---|---|
| JP | H09-126935 | | 5/1997 |
| JP | 2000-343918 | | 12/2000 |
| JP | 2005199466 A | * | 7/2005 |
| JP | 2012-223976 | | 11/2012 |
| JP | 2012-228773 | | 11/2012 |
| WO | WO 2008/057152 | | 5/2008 |

OTHER PUBLICATIONS

JP2005199466A (Year: 2005).*
International Search Report for International Application No. PCT/JP2016/051363 dated Apr. 12, 2016, 2 pages, Japan.

* cited by examiner

TIRE GRIPPING DEVICE AND TIRE INSPECTION METHOD

TECHNICAL FIELD

The present technology relates to a tire gripping device and a tire inspection device.

BACKGROUND ART

Conventionally, tires are required to have their orientation changed and be transported (moved) during the production process, inspection process, distribution process, and selling process. When the tire has its orientation changed or is moved, the tire must be lifted off the surface on which it is placed. For this, a gripping and lifting device is known which is configured to insert gripping members (gripping claws) of a chuck device (tire gripping device) into a tire on the inner side of a bead portion of the tire and enlarge (expand) the gripping members in the tire radial direction so that they press outwardly against the bead portion in the tire radial direction. Such devices are commonly used together with an inspection device in particular. For example, in the inspection during production and the quality inspection of a completed product, the tire is gripped and lifted by the tire gripping device and then rotated about its center axis. In proximity to the tire, an imaging device and various sensors are placed for checking and imaging the entire circumference of the rotating tire. Then, on the basis of the acquired information, processes under the umbrella of quality control (shape inspection and surface inspection) and production management (model and lot verification) are performed (see, for example, Japanese Unexamined Patent Application Publication No. 2000-343918A).

As described above, conventional tire gripping devices include gripping members that expand in the tire radial direction to provide tire gripping force. However, if the center of the tire being gripped and the center of the gripping device are not aligned when the gripping members are expanded in the tire radial direction, the contact positioning (contact state) between the gripping members and the bead portion may be not uniform in the circumferential direction of the bead portion. Non-uniform contact positioning (contact state) may result in the pressure in the tire radial direction being concentrated at a point where a gripping member is disposed, deforming the tire (bead portion). Such a deformation in the tire causes noise in the shape inspection and surface inspection and may reduce the accuracy of the inspections.

SUMMARY

An aspect of the present technology provides a tire gripping device that can suppress tire deformation when a gripping mechanism is inserted in the tire on the inner side of the bead portion to grip the tire.

A tire gripping device according to an embodiment comprises a chuck mechanism that comprises a pair of chuck portions adjacent in a width direction of a tire and a plurality of contact members disposed on each of the chuck portions in a circumferential manner, the plurality of contact members being able to be brought into contact with an open end portion of a bead portion of the tire, and entering a state of allowing for relative movement with a contact surface of the open end portion in a first contact stage and entering a state of non-relative movement with the contact surface in a second contact stage subsequent to the first contact stage; and a driving mechanism that comprises a first driving mechanism for moving the plurality of contact members in a radial direction of the tire and a second driving mechanism for moving the pair of chuck portions in the width direction of the tire.

According to an embodiment, for example, a tire gripping device can be provided that can reduce or suppress deformation of the tire when the contact members are brought into contact with and grip the open end portion of the bead portion of the tire.

DETAILED DESCRIPTION

Figure 1:
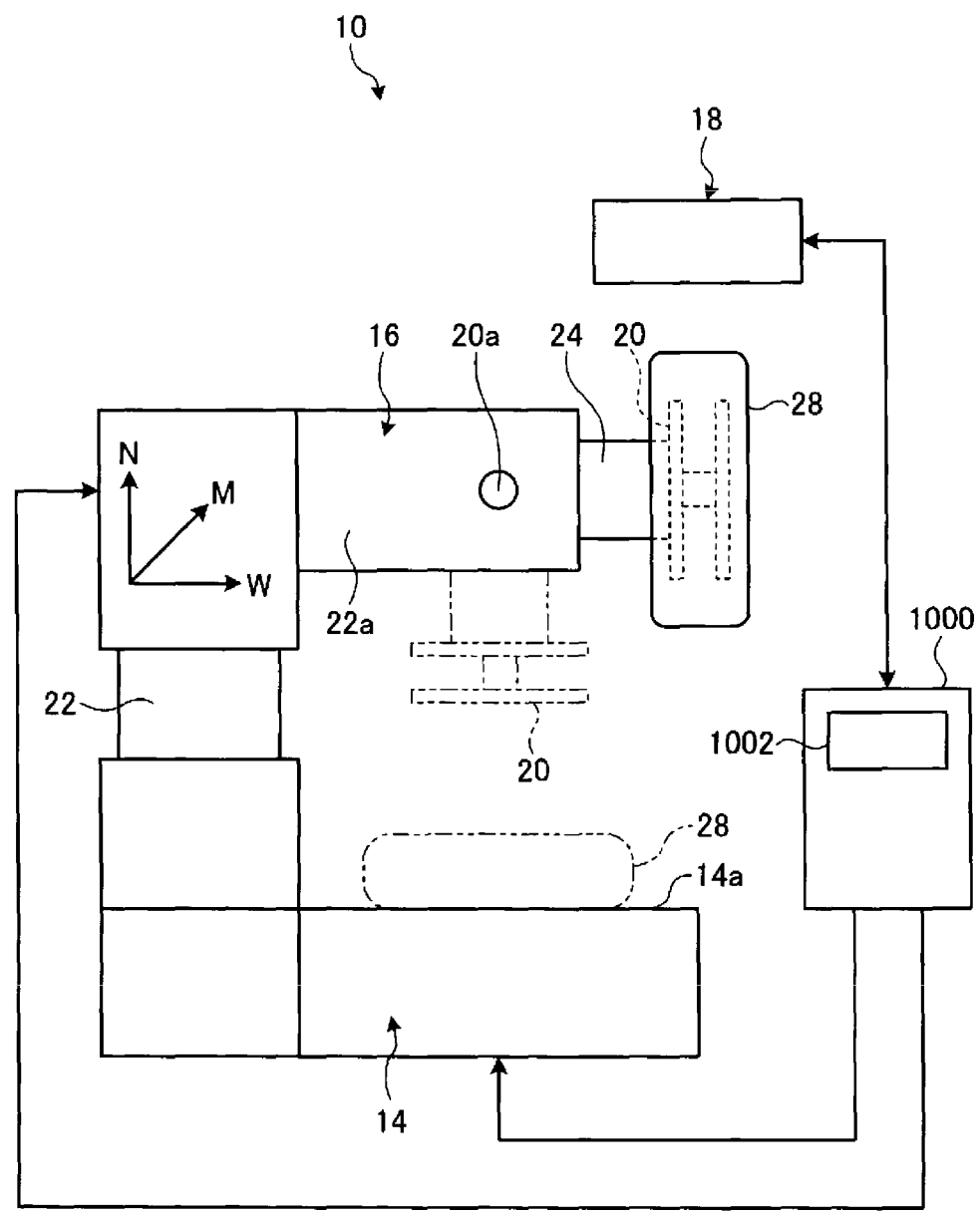
FIG. 1 is a configuration diagram schematically illustrating an example of a tire inspection device that includes a tire gripping device according to an embodiment.

Below, exemplary embodiments of the present technology will be described. The configurations according to the embodiments and the functions and results (effects) provided by the configurations described below are merely examples. The present technology can be achieved with configurations other than those described in the embodiments below, and a basic configuration can be applied to obtain various effects (and derived effects).

In the present embodiment, for example, a tire inspection device 10 images a surface, for example the tread surface of a tire (contact patch) and both side surfaces (shoulder portions, sidewall portions, bead portions) of a completed tire for inspection (surface inspection). The tire inspection device 10 carries out an inspection of the surface shape (for example, presence of deformation) and surface state (for example, presence of damage and fouling) on the basis of the captured image information. Known technology can be used in the items and method for inspection (method of imaging and method of processing the image information), thus a description thereof is omitted.

The tire inspection device 10 includes a stopping station 14, a tire gripping device 16, an inspection unit (imaging portion, inspection portion) 18, an elevator mechanism 22, and a control console 1000. Note that the tire inspection device 10 changes the orientation of a tire 28 for inspection by the inspection unit 18 with the tire 28 in a gripped state. A frame for ensuring the safety of the area around the tire inspection device 10 may be disposed covering the entire of the tire inspection device 10. Additionally, during inspection time, a cover for suppressing the effect of ambient light from the surroundings may be disposed covering the tire inspection device 10 or frame.

The stopping station 14 is able to accept the tire 28 to be inspected and can temporarily stop the tire on the stopping station 14 by switching the transmission of the conveying power between on and off, for example. Before and after the stopping station 14 (before and after in the direction of the arrow M, from upstream to downstream in the inspection step), a non-illustrated conveyor (for example, a roller conveyer 14a) is disposed. The conveyor receives and conveys the tire 28 from another step and conveys and discharges the tire 28 to yet another step. The tire 28 is conveyed to the stopping station 14 placed horizontally (laid down state), for example. The tire 28 stopped at the stopping station 14 is gripped by a chuck unit 20 that constitutes a chuck mechanism of the tire gripping device 16 and transported to the inspection area of the inspection unit 18. Though described in detail below, the chuck mechanism includes a pair of chuck portions adjacent in the width direction of the tire 28. A plurality of contact members are disposed in a circumferential manner on each of the chuck portions, the contact members being able to be brought into contact with an open end portion of the bead portion of the tire 28. The contact members move outward in the tire radial direction and outward in the tire width direction to grip the tire 28. After inspection is completed (for example, after capturing an image), the tire gripping device 16 places the tire 28 back on the stopping station 14 with a horizontal orientation and releases grip on the tire 28. The stopping station 14 sends the tire released from grip to the conveyor on the discharge side.

The chuck unit 20 of the tire gripping device 16 grips the tire 28 stopped on the stopping station 14 and moves the tire 28 to the imaging area of the imaging portion included in the inspection unit 18. In the tire inspection device 10 of the present embodiment, the tire gripping device 16, for example, grips the horizontally placed tire 28 moved to a predetermined position on the stopping station 14, and rotates the tire 28 90° in the vertical direction so that the tread surface and both side surfaces of the tire 28 are in the imaging area. Note that FIG. 1 illustrates the chuck unit 20 of the tire gripping device 16 with the tire 28 having been rotated 90° in the vertical direction and is in an orientation in which inspection can be carried out.

The tire gripping device 16 includes the chuck unit 20, the elevator mechanism 22, and a rotation mechanism 24. Though described in details below, as illustrated in FIG. 2, a plurality of freely expanding and retracting contact members 26 (chuck claws, gripping claws) of the chuck unit 20 grip the tire 28. Note that in FIG. 2, only one of the contact members 26 is illustrated. The elevator mechanism 22 moves the chuck unit 20 and the rotation mechanism 24 in the vertical direction (direction of arrow N in FIG. 1) by a drive source including a motor and a hydraulic pressure cylinder (air pressure or oil pressure). When the elevator mechanism 22 is in its lowered state, the chuck unit 20 grips or releases the tire 28 placed on the stopping station 14. When the elevator mechanism 22 is in its raised state, the chuck unit 20 maintains the tire 28 in its orientation in the imaging area of the inspection unit 18. Note that the rotation mechanism 24 can carry out rotation to change the orientation of the tire 28 between one for inspection (gripped/rotated orientation) and one for conveying (gripped or released orientation) when the tire 28 is fully raised or only partway raised or lowered by the elevator mechanism 22.

Figure 2:
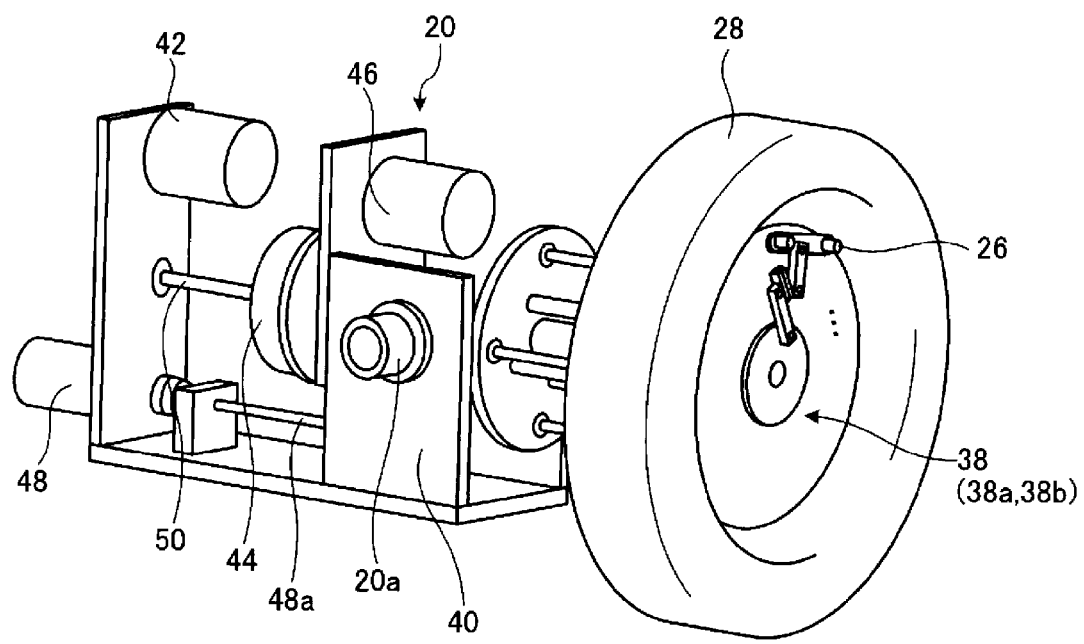
FIG. 2 is a schematic perspective view for explaining how the chuck unit of the tire gripping device according to an embodiment grips a tire.

The rotation mechanism 24 (disposed on the back surface side of an elevator bracket 22a in the embodiment illustrated in FIG. 1), for example, rotates the chuck unit 20 90° about a rotation shaft 20a using drive from a drive source including a motor and a hydraulic pressure cylinder. Note that the rotation angle is preferably set as appropriate depending on the positional relationship between the stopping station 14 and the imaging area of the inspection unit 18.

The inspection unit 18, for example, includes three imaging portions (imaging devices, cameras) for imaging the tread surface and both side surfaces of the tire 28. The inspection unit 18 also includes a light irradiation portion (irradiation device) that irradiates the imaging area of the imaging portion with a predetermined light. The inspection unit 18 is supported in a manner allowing for it to freely move in the direction of the arrow W in the drawing by a non-illustrated imaging movement mechanism and is configured to move the imaging portion and the light irradiation portion to an optimal position relative to the tire 28.

The light irradiation portion, for example, emits a light sheet (a sheet of light, a planar curtain of light, slit light, or a laser light sheet). The imaging portion, for example, may be an area sensor including a 2D array of photoelectric conversion elements (photoelectric conversion portion), which is a solid state imaging device such as a charge coupled device (CCD) image sensor or a complementary metal oxide semiconductor (CMOS) image sensor.

Furthermore, the tire inspection device 10 may include an operation display lamp that indicates when the tire inspection device 10 is in operation, an error indication lamp that warns when an abnormality is found in the tire 28, the control console (control portion) 1000, and a display device 1002 (disposed above the control console 1000 for example). The control console 1000 functions as a control portion for the entire tire inspection device 10 and controls the stopping station 14, the tire gripping device 16 (elevator mechanism 22), and the inspection unit 18 both individually and in cooperation. The control console 1000 includes a central processing unit (CPU) that functions as the control portion, a read only memory (ROM), a random access memory (RAM), a non volatile ram (NVRAM), a sensor controller, a motor controller, a communication interface, operation switches (a keyboard), and the like. Control programs and inspection programs associated with control of the tire inspection device 10 described below are stored in the ROM. The CPU executes, on the RAM, various computer-readable programs stored in the storage portion such as the ROM, and controls the motor, the imaging portion, the light irradiation portion, and the like of the stopping station 14, the tire gripping device 16, and the inspection unit 18 in accordance with signals and operation instruction from the various sensors. Additionally, an inspection using the captured inspection images is executed on the RAM in accordance with the inspection program stored in the ROM. The ROM stores various data and programs that are executed by the CPU. The RAM temporarily stores data and programs when the CPU executes a program. The NVRAM can store various data that persists even when the power is off. The CPU can send to an upper system the inspection results and the operational state of the tire inspection device 10 via the communication interface.

The display device 1002 can display information on the operational state of the tire inspection device 10 and inspection results (for example, a yes/no determination) or guidance messages for how to start the tire inspection device 10 or restart after the tire inspection device 10 is stopped. The CPU can output audio messages with the same information as these messages via a speaker. Note that FIG. 1 illustrates a configuration in which the display device 1002 is disposed on the control console 1000. However, in another configuration, the display device 1002 may be disposed individually. Additionally, the control console 1000 and the display device 1002 may be disposed independent of the tire inspection device 10. The control console 1000 and the display device 1002 may be formed integrally with a control unit that controls the entire production process including the tire inspection device 10 or a control unit that controls another device.

FIG. 2 is a perspective view for explaining the structure of the chuck unit 20 in detail and illustrates a chuck portion body 38 included in the chuck unit 20 gripping the tire 28. The chuck unit 20 includes the chuck portion body 38, a bracket 40, a gripping/rotation actuator 42, a clutch portion 44, a main shaft brake 46, and a width expanding actuator 48.

Figure 9:
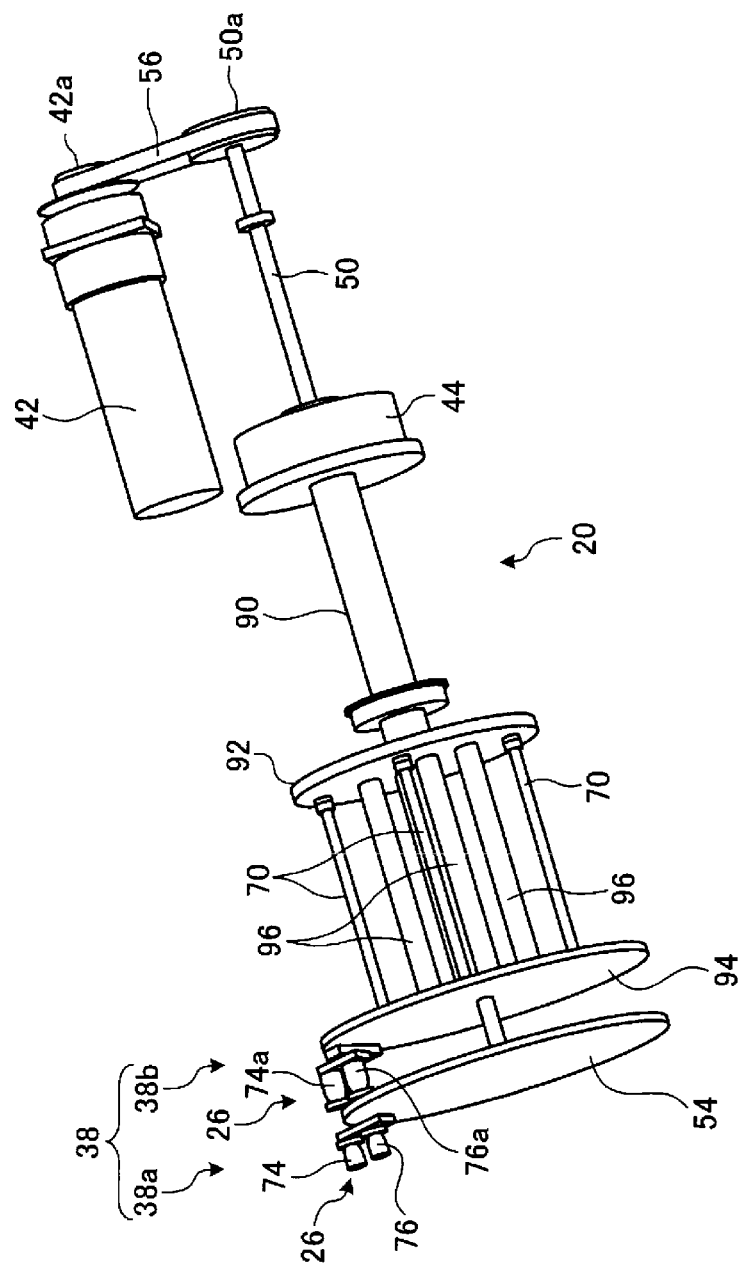
FIG. 9 is an explanatory diagram for explaining how the entire chuck portion body rotates with a clutch portion of a chuck unit of a tire gripping device according to an embodiment being in an engaged state.
Figure 12:
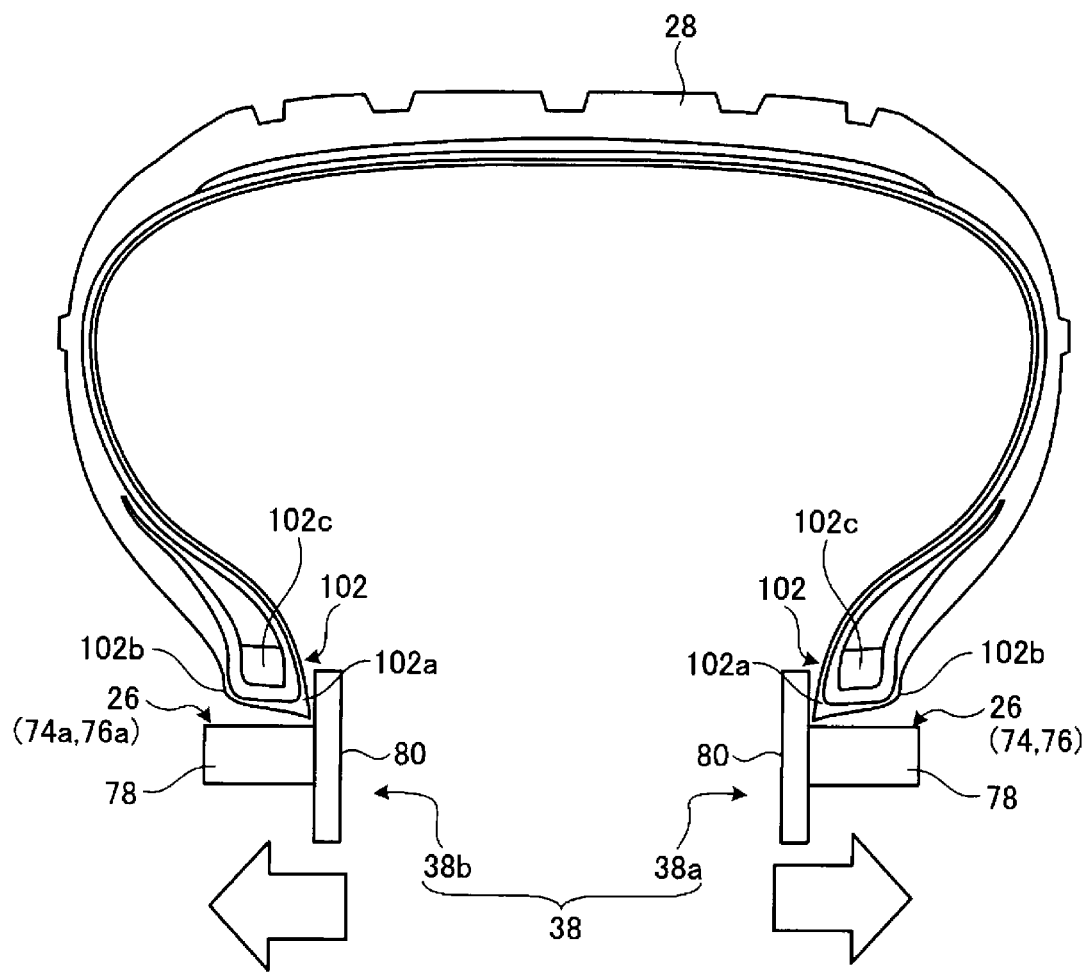
FIG. 12 is an explanatory diagram for explaining how contact members of a tire gripping device according to an embodiment expand in the tire width direction.

The chuck portion body 38 includes, for example, a pair of chuck portions 38a, 38b (see FIGS. 9 and 12). The chuck portions 38a, 38b each include the plurality of contact members 26 that expand and retract in the radial direction of the tire 28 and employ a link mechanism. The tire 28 is gripped by the contact members 26 being inserted in the tire 28 on the radially inner side of the bead portion. Additionally, with the tire 28 gripped by the contact members 26, by moving the pair of chuck portions 38a, 38b in the width direction of the tire 28 (moving the pair of chuck portions 38a, 38b away from each other), tension is applied to the tire 28 in the width direction to correct the shape (external shape) for inspection.

The bracket 40 is supported by the elevator bracket 22a illustrated in FIG. 1 and supports the entire of the chuck unit 20. The bracket 40 is provided with a non-illustrated actuator such as a motor and a gear device. By driving the actuator, the tire 28 is rotated between the gripping/release orientation position and the inspection orientation position of the tire with the actuator and the bracket 40 supporting the chuck portion body 38.

By the gripping/rotation actuator 42 rotating a drive shaft 50 connected to the clutch portion 44, the expanding/retracting movement of the contact members 26 of the chuck portion body 38 and the rotation movement of the entire chuck portion body 38 (rotation movement with the tire 28 orientated in a gripped and fixed state) can be achieved. The gripping/rotation actuator 42, the operation of the clutch portion 44, and the behavior of the chuck portion body 38 will be described below.

When the entire of the chuck portion body 38 rotates with the tire 28 in a gripped orientation, the main shaft brake 46 disengages the brake and allows the entire chuck portion body 38 to rotate. When the contact members 26 move to expand or retract, the main shaft brake 46 engages a braking force to stop the rotation of the entire chuck portion body 38. In another embodiment, the main shaft brake 46 may be of a type that moves a latch or gears, or of a type that engages an electromagnetic brake.

The width expanding actuator 48 includes, for example, a motor, and by rotating a drive shaft 48a, the pair of chuck portions 38a, 38b (chuck base plates described below) that constitute the chuck portion body 38 are moved toward or away from each other. By such an operation, the bead portions of the tire 28 gripped by the contact members 26 disposed in a circumferential manner on the chuck portions 38a, 38b can be expanded in the width direction of the tire 28. Accordingly, a predetermined tension can be applied to both side surfaces of the tire 28, and the shape of the side surface can be stabilized (corrected for inspection), thus reducing inspection noise caused by the shape.

Figure 3:
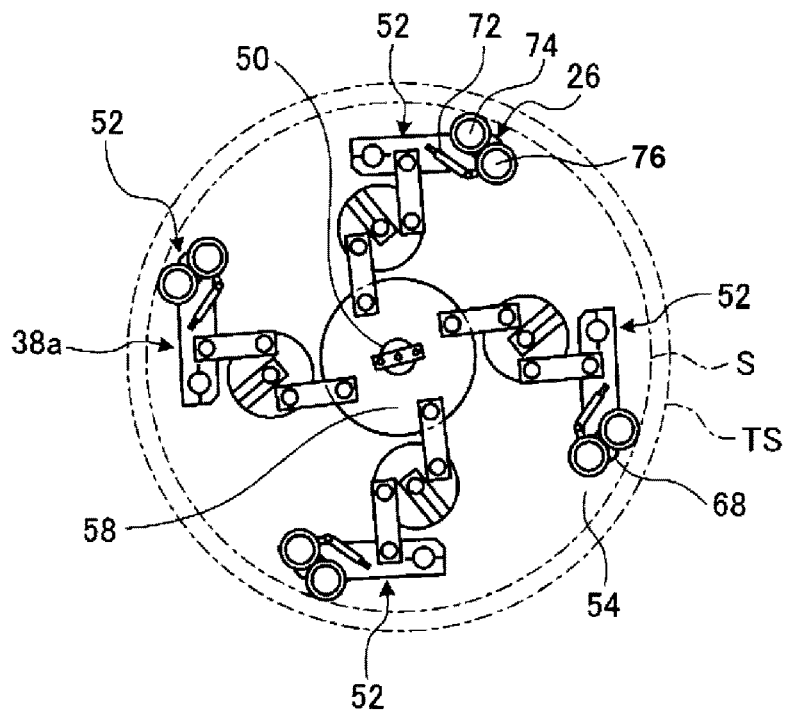
FIG. 3 is a schematic plan view for explaining a retracted state (released state, non-gripping state) of contact members of a chuck portion (chuck portion body) of a tire gripping device according to an embodiment.

The chuck portion body 38 includes the pair of chuck portions 38a, 38b as described above. As illustrated in FIG. 3, the chuck portion 38a, for example, includes a plurality of link mechanisms 52 disposed in a circumferential manner on a substantially circular plate-like chuck base plate 54. Each link mechanism 52 expands and retracts the corresponding contact member 26. In a similar manner, the chuck portion 38b, for example, includes a plurality of link mechanisms 52 with the same configuration as the link mechanisms 52 on the chuck base plate 54 disposed on a substantially circular plate-like chuck base plate 94 (see FIG. 8). Each link mechanism 52 expands and retracts the corresponding contact member 26. The chuck portion 38a (chuck base plate 54) and the chuck portion 38b (chuck base plate 94) are disposed parallel with each other in the width direction of the tire 28 (see FIG. 1). Note that in the present embodiment, in regards to the chuck portion body 38 that constitutes the chuck mechanism, the chuck portion 38a may be referred to as "first chuck portion" or "lower chuck portion", and the chuck base plate 54 may also be referred to as "first chuck portion" or "lower chuck portion." Additionally, the other of the pair, chuck portion 38b, may be referred to as "second chuck portion" or "upper chuck portion", and the chuck base plate 94 may also be referred to as "second chuck portion" or "upper chuck portion." Note that in the configuration of FIG. 3, only the chuck base plate 54 that constitutes the chuck portion 38a (first chuck portion) is illustrated with the link mechanisms 52 and the contact members 26 while the chuck base plate 94 that constitutes the chuck portion 38b (second chuck portion) is omitted. Note that in reference to the configuration of FIG. 8, the chuck base plate 54 located on the tip end side of the drive shaft 50 may be referred to as the outer (outer side) chuck base plate 54, and the chuck base plate 94 on the side proximal to the gripping/rotation actuator 42 may be referred to as the inner (inner side) chuck base plate 94.

Figure 8:
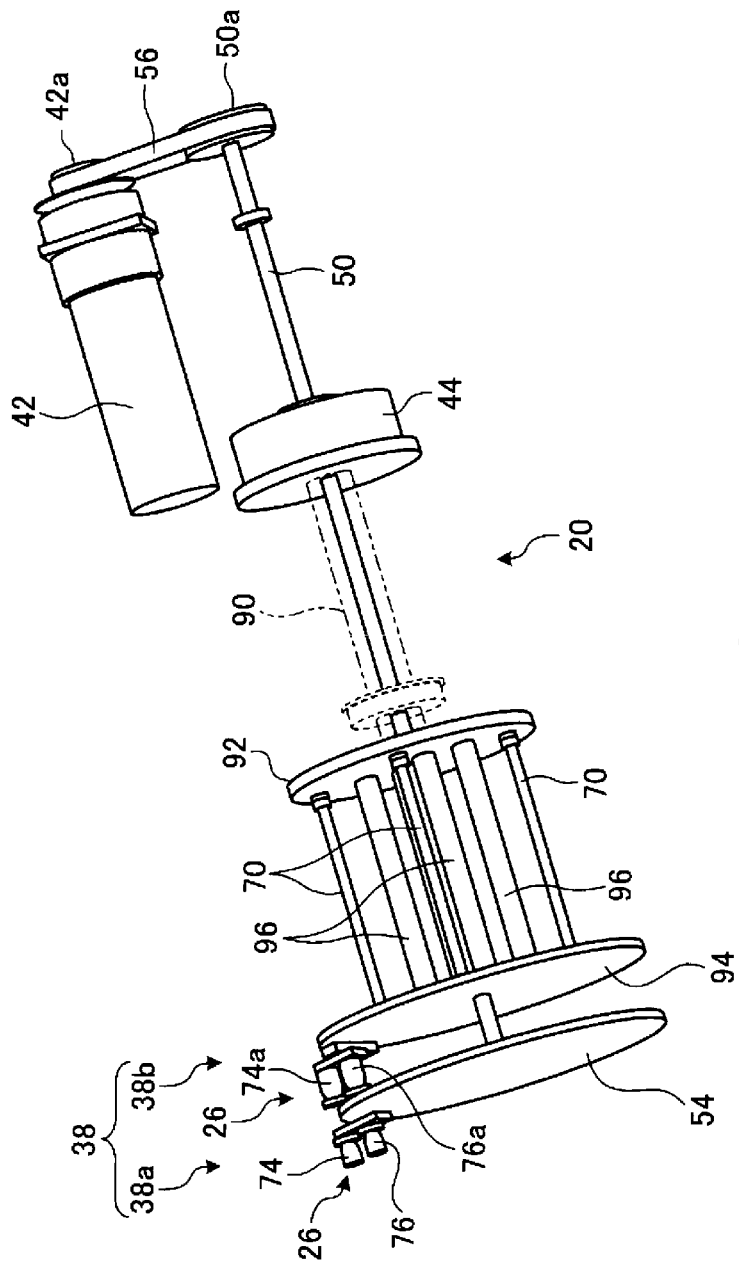
FIG. 8 is an explanatory diagram for explaining how contact members of a chuck portion body are expanded and retracted with a clutch portion of a chuck unit of a tire gripping device according to an embodiment being in a disengaged state.

As described above, the chuck portion body 38 grips the tire 28 by the plurality of contact members 26 being moved in the radial direction and width direction of the tire 28. The contact members 26 are moved in the radial direction of the tire 28 by the gripping/rotation actuator 42 functioning as a first driving mechanism and the drive shaft 50 which is driven by the gripping/rotation actuator 42 in rotation. As illustrated in FIG. 8, the driving force of the gripping/rotation actuator 42 is transmitted to the drive shaft 50 via a drive belt 56 that extends between a pulley 42a fixed to the output shaft of the gripping/rotation actuator 42 and a pulley 50a fixed to an end portion of the drive shaft 50. Note that in the present embodiment, the drive shaft 50 is only connected to the outer chuck base plate 54 (chuck portion 38a). Additionally, the contact members 26 are moved in the width direction of the tire 28 by a driving force transmitted from the width expanding actuator 48 functioning as a second driving mechanism, through the drive shaft 48a which drives the width expanding actuator 48 in rotation, and to the chuck portion body 38 (see FIG. 2). In other words, the inner chuck base plate 94 (chuck portion 38b, see FIG. 8) moves relative to the outer chuck base plate 54 (chuck portion 38a) in the width direction along an interlock shaft 70 that indirectly supports the chuck base plate 94 via the driving force from the width expanding actuator 48. Note that the first driving mechanism and the second driving mechanism may be referred to collectively as "driving mechanism."

Figure 4:
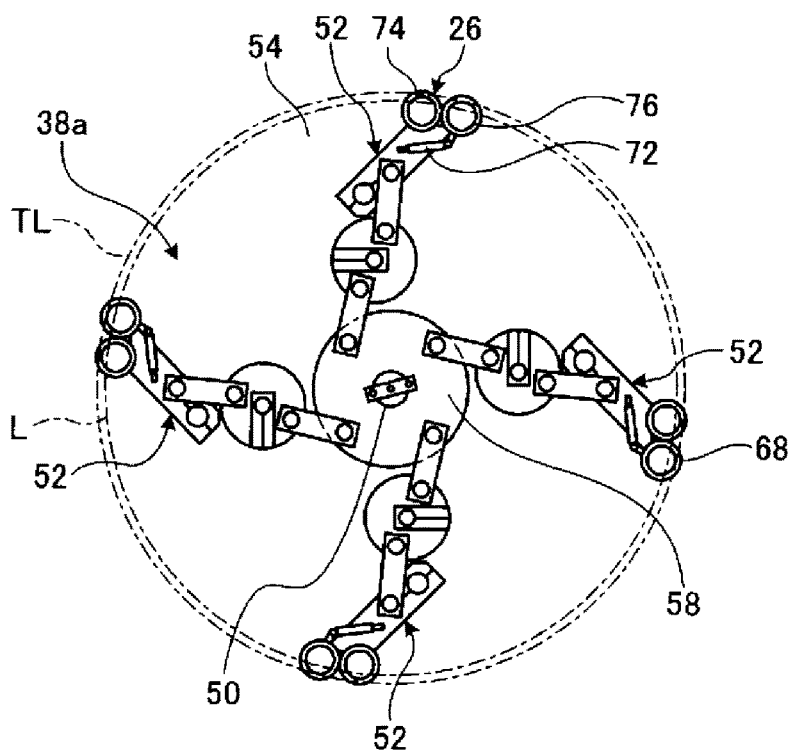
FIG. 4 is a schematic plan view for explaining an expanded state (gripping state) of contact members of a chuck portion (chuck portion body) of a tire gripping device according to an embodiment.
Figure 5:
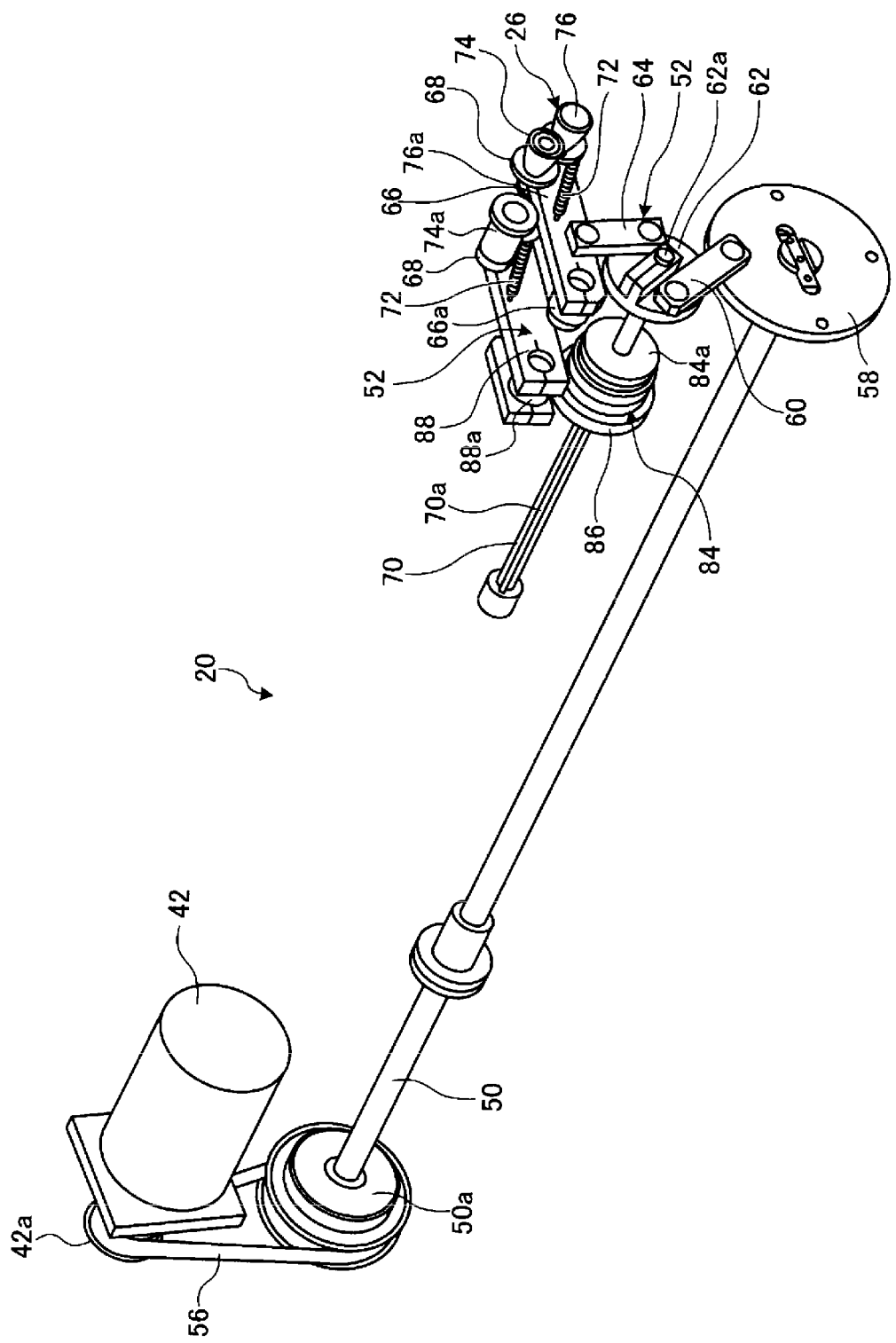
FIG. 5 is a schematic perspective view for explaining in detail the structure of a chuck portion body (link mechanism) of a tire gripping device according to an embodiment.

FIGS. 3 to 5 will be used to explain the configuration of the link mechanisms 52 that move the contact members 26 supported on the chuck base plate 54 (chuck portion 38a). Note that FIG. 5 illustrates only one set of the link mechanisms 52 and the other three sets are omitted. Additionally, the configuration of the contact members 26 of the chuck base plate 54 and the chuck base plate 94 (chuck portion 38b, see FIG. 8) are essentially identical, and herein the structure of the chuck base plate 54 (chuck portion 38a) will be used in the description.

In the present embodiment, for example, four link mechanisms 52 are disposed on the chuck base plate 54 in the circumferential direction (circumferential manner) at substantially equal intervals (90° intervals). Note that this number for the link mechanisms 52 disposed on the chuck base plate 54 (94) is merely an example and the number four is not to be considered a limitation. The number may be five or more or three. As illustrated in FIG. 5, the link mechanisms 52 each include a plurality of disc-shaped plates and link arms. A first link plate 58 is fixed to one end of the drive shaft 50 driven in rotation by the gripping/rotation actuator 42. The first link plate 58 is rotatably supported by the chuck base plate 54. The first link plate 58 is, for example, substantially disc shaped and supports the link mechanisms 52 near its edge at substantially equal intervals. When the tire 28 is moved in rotation (during inspection imaging), that is, when the link mechanisms 52 are in position to maintain grip on the tire 28, the first link plate 58 fully rotates in concert with the tire at the required rotational speed (rotational speed required for inspection imaging).

The link mechanisms 52 each include a first link arm 60, a second link plate 62, a second link arm 64, a third link arm 66, a base plate 68, the contact member 26, and the like. The first link arm 60, for example, is a substantially rectangular plate member. One end of the first link arm 60 is rotatably supported on the first link plate 58 near the edge portion, and the other end is rotatably supported on the second link plate 62 near the edge portion. The second link plate 62, for example, is a substantially disc-shaped component and is rotatably supported by the non-illustrated chuck base plate 54 (see FIG. 3). On the second link plate 62, one end of the second link arm 64 is rotatably supported at a position opposing the position where the first link arm 60 is connected, for example on the opposite side of a center of rotation 62a. Note that the positions where the first link arm 60 and the second link arm 64 are attached to the second link plate 62 are selected as appropriate depending on the mode of movement (movement stroke) required by the link mechanism 52. Additionally, the interlock shaft 70 is fixed at the center of rotation 62a of the second link plate 62. The interlock shaft 70 is fixed to the second link plate 62 at the center of rotation 62a and rotatably supported via a bearing by the chuck base plate 54 so as to rotate together with the second link plate 62 in concert with the rotation of the first link plate 58. By the interlock shaft 70 rotating, the contact members 26 supported by the non-illustrated chuck base plate 94 (see FIG. 8) expand or retract. As described above, when the chuck base plate 54 and the chuck base plate 94 (see FIG. 8) separate from one another, the interlock shaft 70 functions as a guide member and stabilizes the expanding movement in the width direction of the bead portions of the tire 28. Additionally, the interlock shaft 70 functions as a rotational force transmitting member when the entire chuck portion body 38 rotates for imaging of the surface of the tire 28.

The second link arm 64, for example, is a substantially rectangular plate member. One end of the second link arm 64 is rotatably supported on the second link plate 62 near the edge portion, and the other end is rotatably supported on the third link arm 66 at a position distanced from the central portion. The third link arm 66, for example, is a substantially rectangular plate member. One end of the third link arm 66 is rotatably supported and connected to a bearing 66a fixed to the non-illustrated chuck base plate 54 (see FIG. 3) near the edge portion. Additionally, the other end of the third link arm 66 pivotally supports (for swinging movement) the base plate 68 (swinging member) that supports the contact member 26. The third link arm 66 is swung about the center of the bearing 66a by the movement of the second link arm 64 and presses the contact member 26 against the bead portion of the tire 28. One end of spring 72, for example, that functions as a biasing member is fixed to the third link arm 66. The other end of the spring 72 is connected to a portion of the base plate 68 that supports the contact member 26, and in the resting state, pulls one side of the base plate 68 (side where the second contact member 76, 76a is disposed) in a direction toward the bearing 66a. The base plate 68, for example, is a substantially rectangular plate member and supports a first contact member 74 and a second contact member 76 which function as contact members 26 on both end portions in the longitudinal direction. Though described in detail below, the biasing force from the spring 72 keeps the orientation of the base plate 68 in the predetermined biased orientation described above in a manner so that the second contact member 76 is prevented from coming into contact with the bead portion before the first contact member 74. Note that the means for providing a biasing force to prevent the second contact member 76 from coming into contact with the bead portion before the first contact member 74 is not limited to the spring 72, and for example, a link mechanism or an actuator can be used to achieve the same effect.

Figure 6:
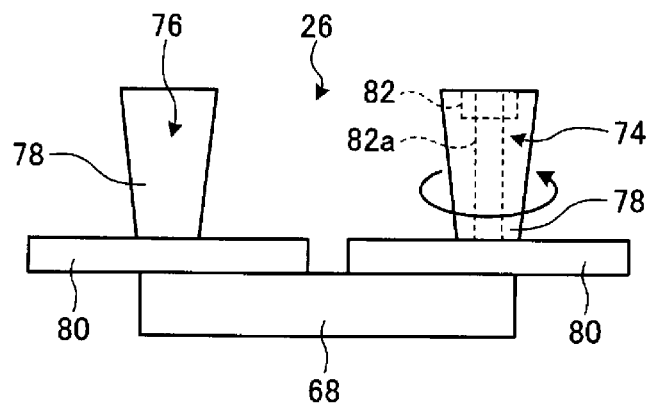
FIG. 6 is a schematic perspective view for explaining the shape of contact members of a forward chuck portion of a tire gripping device according to an embodiment.

FIG. 6 is a plan view for explaining the shape of the contact members 26 (first contact member 74 and the second contact member 76) of the link mechanism 52 (see FIG. 5) provided on the chuck base plate 54 (chuck portion 38a). The first contact member 74 and the second contact member 76 have substantially an identical shape, and include a main portion 78 which is a truncated cone with a tapered portion (tapered surface) and a disc-shaped flange portion 80 joined to the main portion 78 on the side with the smaller diameter. The first contact member 74 and the second contact member 76 constituting the link mechanism 52 provided on the chuck base plate 54 are connected to the base plate 68 at the flange portion 80. The first contact member 74, for example, includes a self-rotation mechanism using a bearing 82 disposed inside the first contact member 74, and is rotatable about a rotation shaft 82a fixed to the base plate 68. The second contact member 76 is fixed to the base plate 68 in a non-rotatable manner. As described above, the side where the second contact member 76 is disposed is pulled toward the bearing 66a by the biasing force from the spring 72 so that when the contact members 26 come into contact with the bead portion of the tire 28, the first contact member 74 always comes into contact with the bead portion before the second contact member 76. In other words, after the first contact member 74 and the bead portion of the tire 28 come into contact, the chuck portion body 38 expands in diameter until the second contact member 76 comes into contact with the bead portion, the process until this point in time being defined as the initial stage (first contact stage). In the initial stage (first contact stage), the first contact member 74 in contact with the bead portion rotates as the chuck portion body 38 expands in diameter. As a result, the position where the first contact member 74 and the bead portion of the tire 28 are in contact relative to one another changes. In other words, in the first contact stage, the first contact member 74 is in contact in a state allowing for relative movement with the position of contact relative to one another changing (being allowed). By the first contact member 74 and the bead portion being brought in contact in such a manner allowing for relative movement, deviation in the gripping force (deviation in the pressure against the bead portion) can be alleviated.

Here, a comparative example in which the contact members 26 and the bead portion do not come into contact in a manner allowing for relative movement will be considered. In this example, the tire 28 is gripped with the machine center position of the chuck portion body 38 (for example, the center of the first link plate 58) and the center position of the tire 28 stopped on the stopping station 14 being misaligned (see FIG. 1). At least one of the plurality of contact members 26 that constitute the chuck portion body 38 comes into contact with the bead portion of the tire 28 which is located closest to the machine center position of the chuck portion body 38. Following on, when the contact members 26 expand in diameter, the contact members 26 apply pressure to the bead portion in the direction moving the tire 28 so as to align the machine center position of the chuck portion body 38 and the center position of the tire 28. When this occurs, the pressure to slide the tire 28 across the stopping station 14 is concentrated in one region of the bead portion, and the shape of the tire 28 is deformed (bent). The amount of deformation (bend) of the tire 28 changes depending on the amount that the position of the chuck portion body 38 and the tire 28 are misaligned. Should the tire 28 in such a deformed state be completely gripped and then imaged for inspection by the inspection unit 18, the inspection will be performed on the bent shape and thus may result in a decrease in the accuracy of the inspection of the tire 28.

However, in the chuck portion body 38 of the present embodiment, the first contact member 74 and the contact surface of the bead portion (open end portion) are in contact in a manner allowing for relative movement in the initial stage of contact (first contact stage). Thus, the pressure can be distributed. In other words, the stress concentration when pressure is applied can be alleviated, and localized deformation (bending) of the tire 28 can be suppressed. The stress concentration is suppressed, and the tire 28 is moved across the stopping station 14 so that the machine center position of the chuck portion body 38 and the center position of the tire 28 are aligned. Thereafter, in the second contact stage after the first contact stage, following on from the first contact member 74, the second contact member 76 comes into contact with the contact surface of the bead portion. The second contact member 76 is fixed to the base plate 68. Thus, when the chuck portion body 38 is expanded in diameter with the second contact member 76 in contact with the contact surface of the bead portion of the tire 28, the second contact member 76 and the bead portion of the tire 28 do not move relative to one another as in the case of the first contact member 74, pushing the bead portion out in the diameter expanding direction. In other words, in the second contact stage, the second contact member 76 is in contact in a state in which relative movement does not occur at the contact position. By the second contact member 76 being in contact in such a state of non-relative movement, the entire contact member 26 is put in a state of non-relative movement, and the bead portion can be gripped with the machine center position of the chuck portion body 38 and the center position of the tire 28 being substantially aligned (centered).

In other words, gripping of the tire 28 is completed with the tire in a well-balanced orientation.

Figure 7:
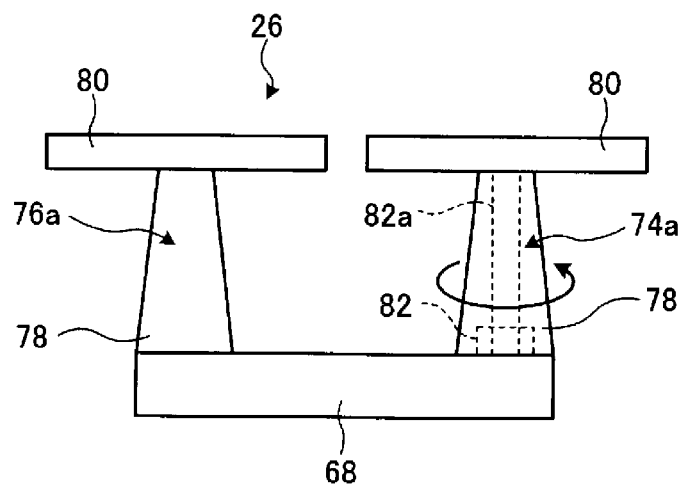
FIG. 7 is a schematic perspective view for explaining the shape of contact members of a back chuck portion of a tire gripping device according to an embodiment.

FIG. 7 is a plan view for explaining the shape of the contact members 26 (a first contact member 74a and the second contact member 76a) of the link mechanism 52 (see FIG. 5) provided on the chuck base plate 94 (chuck portion 38b, see FIG. 8). The first contact member 74a and the second contact member 76a of the chuck base plate 94 have a similar shape to that of the first contact member 74 and the second contact member 76 of the chuck base plate 54. However, in the present embodiment, the main portion 78 of the first contact member 74a and the second contact member 76a is longer than that of the first contact member 74 and the second contact member 76. The difference in length is to facilitate smooth gripping by the contact members 26 when the gripping process described below of the present embodiment is carried out. However, the lengths of the main portion 78 are not required to be different and may be the same. Additionally, depending on the gripping process, the main portion 78 of the first contact member 74 and the second contact member 76 may be longer than that of the first contact member 74a and the second contact member 76a. The main portion 78 of first contact member 74a and the second contact member 76a is a truncated cone with a tapered portion and is joined to the disc-shaped flange portion 80 on the side of the main portion 78 with the smaller diameter. However, the first contact member 74a and the second contact member 76a constituting the link mechanism 52 provided on the chuck base plate 94 are connected to the base plate 68 via the main portion 78 at the side with the larger diameter (side where the flange portion 80 is not joined). Note that in a similar manner to the first contact member 74, the first contact member 74a includes a self-rotation mechanism provided with the bearing 82 disposed inside the first contact member 74a, and is rotatable about the rotation shaft 82a fixed to the base plate 68. Due to the self-rotation mechanism of the first contact member 74a, when the contact members 26 supported on the chuck base plate 94 come into contact with and grip the bead portion of the tire 28, gripping with suppressed stress concentration can be achieved in a similar manner to that of the contact members 26 supported on the chuck base plate 54. The second contact member 76a is fixed to the base plate 68 in a non-rotatable manner. As a result, in a similar manner to that of the second contact member 76, the bead portion can be gripped with the machine center position of the chuck portion body 38 and the center position of the tire 28 being substantially aligned (centered). In other words, gripping of the tire 28 is completed with the tire in a well-balanced orientation.

Returning to FIG. 5, the interlock shaft 70 that moves the contact members 26 of the chuck base plate 94 (see FIG. 8), for example, is a spline shaft with spline grooves 70a and includes a ball spline 84 provided with an outer cylinder portion 84a on the spline shaft. A second link plate 86 and the non-illustrated chuck base plate 94 are fixed to the end surface of the outer cylinder portion 84a. As illustrated in FIG. 5, a third link arm 88 is rotatably supported on the chuck base plate 94 (not illustrated) via a bearing 88a, and the second link arm 64 (not illustrated) is connected to the third link arm 88 on the back side. Additionally, the base plate 68 is rotatably connected to one end of the third link arm 88, and the first contact member 74a and the second contact member 76a are supported on the base plate 68 (see FIG. 7). Accordingly, the second link plate 86, the chuck base plate 94 (not illustrated), and the third link arm 88 supported by the chuck base plate 94, the base plate 68, the first contact member 74a, and the second contact member 76a are moveable in the axial direction of the interlock shaft 70 in cooperation with the outer cylinder portion 84a. In the present embodiment, the drive shaft 48a of the width expanding actuator 48 illustrated in FIG. 2, for example, is connected to the chuck base plate 94. As a result, the drive of the width expanding actuator 48 moves the chuck base plate 94 in the width direction of the tire 28 and width expanding movement is achieved.

The link mechanisms 52 configured in this manner have two modes: a gripping state in which the tire 28 is gripped via the rotation of the drive shaft 50, or in other words the first link plate 58, and a release state in which the grip is released. FIG. 3 illustrates the link mechanisms 52 with the tire 28 in a released state. FIG. 4 illustrates the link mechanisms 52 in a state gripping the tire 28. As illustrated in FIG. 3, when the tire 28 is in a released state, the link mechanisms 52 are retracted (in a retracted diameter state) with the contact members 26 (first contact members 74 and second contact members 76) positioned inward of a smallest diameter size S which has a predetermined small diameter, the smallest diameter size S being positioned inward of a rim diameter TS of the smallest tire size possible for inspection by the tire inspection device 10. As a result, the chuck portion body 38 can smoothly enter or leave the tire 28 on the radially inner side of the bead portion to grip or release the tire 28. Note that when the link mechanisms 52 are in a retracted state as illustrated in FIG. 3, the base plates 68 that supports the second contact members 76 are kept in a first orientation by the biasing force of the springs 72. In the first orientation, the second contact members 76 are in a position away from the bead portion so that the first contact members 74 come into contact with the contact surface of the bead portion before the second contact members 76. As illustrated in FIG. 4, when the tire 28 is in a gripped state, the link mechanisms 52 are extended with the contact members 26 (first contact members 74 and second contact members 76) positioned outward of a largest diameter size L which has a predetermined large diameter, the largest diameter size L being positioned inward of a rim diameter TL of the largest tire size possible for inspection by the tire inspection device 10. Upon extension, the base plate 68 is urged against the biasing force of the spring 72 and slides, changing to a second orientation in which the second contact member 76 comes into contact with the bead portion and securely grips the tire 28. As a result, the tire 28 can be safely and smoothly lifted up to have its orientation changed or be rotated. Note that in the present embodiment, the tire size which the tire inspection device 10 can inspect can be, for example, 14 inches and 15 inches. In such a case, the amount the link mechanisms 52 extend can be controlled depending on the rotational amount of the first link plate 58 (drive shaft 50). For example, when a 14 inch tire is used, the first link plate 58 is controlled to rotate to reach a first extension amount. When a 15 inch tire is used, the first link plate 58 is controlled to rotate to reach to a second extension amount. The rotation control of the first link plate 58 (drive shaft 50), for example, can be achieved by rotational speed control or torque control of the gripping/rotation actuator 42. Note that in another embodiment, the extension amount of the link mechanisms 52 is determined per tire size, and the gripping/rotation actuator 42 is controlled on the basis of the extension amount of the link mechanisms 52.

As described above, the mode by which the driving force of the gripping/rotation actuator 42 is transmitted can be changed by the clutch portion 44 (see FIG. 2). In other words, the clutch portion 44 switches between a state in which drive force is transmitted for gripping and a state in which drive force is transmitted for rotation. In the gripping drive force transmission state, power for expanding/retracting the contact members 26 of the chuck portion body 38 is transmitted from the gripping/rotation actuator 42. In the rotation drive force transmission state, power for rotating the entire chuck portion body 38 (rotating the tire 28 in a gripped orientation) is transmitted from the gripping/rotation actuator 42. In such a manner, by using the clutch portion 44 to switch between the power transmission states of the gripping/rotation actuator 42, the device as a whole can be made more compact and cost can be reduced.

Now, using FIG. 8, a state in which the clutch portion 44 is disengaged will be described. Note that as illustrated in FIG. 3 and the like, the plurality of contact members 26 (link mechanisms 52) are disposed on the chuck base plates 54, 94. However, in FIG. 8 and FIG. 9 which is described below, the drawings are simplified so that only one set of the contact members 26 (link mechanisms 52) is disposed on the chuck base plates 54, 94. The clutch portion 44 is disposed at a predetermined position on the drive shaft 50, for example, near an intermediate position. The clutch portion 44, for example, can switch between engaged and disengaged states at a predetermined timing by a voltage being applied in accordance with a signal from the control console 1000. Additionally, the clutch portion 44, for example, may switch between the engaged and disengaged states via control of an actuator such as a solenoid, motor, or hydraulic pressure cylinder. When the clutch portion 44 is in the engaged state, the drive shaft 50 and a pipe-like rotation main shaft 90 that encases the drive shaft 50 are mechanically connected and rotate integrally. When the clutch portion 44 is in the disengaged state, the mechanical connection between the drive shaft 50 and the rotation main shaft 90 is removed and only the drive shaft 50 rotates. Note that in this state, the rotation main shaft 90 is in a locked state (non-rotating state) by a braking force being applied to it by the main shaft brake 46 (see FIG. 2). Thus, when the clutch portion 44 is in the disengaged state, the rotational force of the gripping/rotation actuator 42 is only transmitted to the drive shaft 50 via the pulley 42a, the drive belt 56, and the pulley 50a. As a result, as illustrated in FIGS. 3 to 5, the drive shaft 50 can expand and retract the contact members 26 of the chuck base plate 54 and the contact members 26 of the chuck base plate 94. Note that a guide plate 92 is fixed to the rotation main shaft 90. The guide plate 92 rotatably supports a plurality (for example, four) of the interlock shafts 70 in a manner also allowing for sliding in the axial direction. Additionally, the guide plate 92 supports a plurality (for example, four) of guide shafts 96 in a manner allowing for sliding in the axial direction, the guide shafts 96 being fixed to the chuck base plate 94.

Now, using FIG. 9, a state in which the clutch portion 44 is engaged will be described. When the clutch portion 44 is in the engaged state, the drive shaft 50 and the pipe-like rotation main shaft 90 that encases the drive shaft 50 are mechanically connected and rotate integrally. In this state, the main shaft brake 46 (see FIG. 2) that applies braking force to the rotation main shaft 90 is released, allowing the rotation main shaft 90 to rotate. As described above, the guide plate 92 supports the plurality of interlock shafts 70 and guide shafts 96 in a manner allowing for sliding in the axial direction. As a result, when the guide plate 92 rotates integrally with the rotation main shaft 90, the chuck base plate 54 that supports the interlock shafts 70 rotates. In a similar manner, when the guide plate 92 rotates integrally with the rotation main shaft 90, the chuck base plate 94 to which the guide shafts 96 are fixed rotates. Upon rotation, because the rotation main shaft 90 and the drive shaft 50 rotate together, the contact members 26 of the chuck base plate 54 and the chuck base plate 94 are continuously applied with a driving force in the expanding direction. Thus, the entire chuck portion body 38 rotates with the gripping force on the tire being maintained. In other words, the chuck portion body 38 and the tire 28 rotate together. Note that the chuck base plate 94 support the interlock shafts 70 in a manner allowing for sliding in the axial direction, and the guide plate 92 supports the interlock shafts 70 and the guide shafts 96 in a manner allowing for sliding in the axial direction. Accordingly, the chuck base plate 94 can be moved in the direction away or toward the chuck base plate 54 by the width expanding actuator 48. As a result, the contact members 26 of the chuck base plate 54 and the contact members 26 of the chuck base plate 94 can expand in the width direction of the tire 28 while maintaining a gripping state. In other words, the chuck portion body 38 can rotate the tire 28 in an orientation in which the tire 28 is gripped in the radial direction and the width direction.

The movement of the link mechanisms 52 and the contact members 26 configured in such a manner will be described using the schematic drawings in FIGS. 10 to 13. Note that FIGS. 10 to 13 are simplified drawings with only one of the link mechanisms 52 for the four contact members 26 being illustrated.

Figure 10:
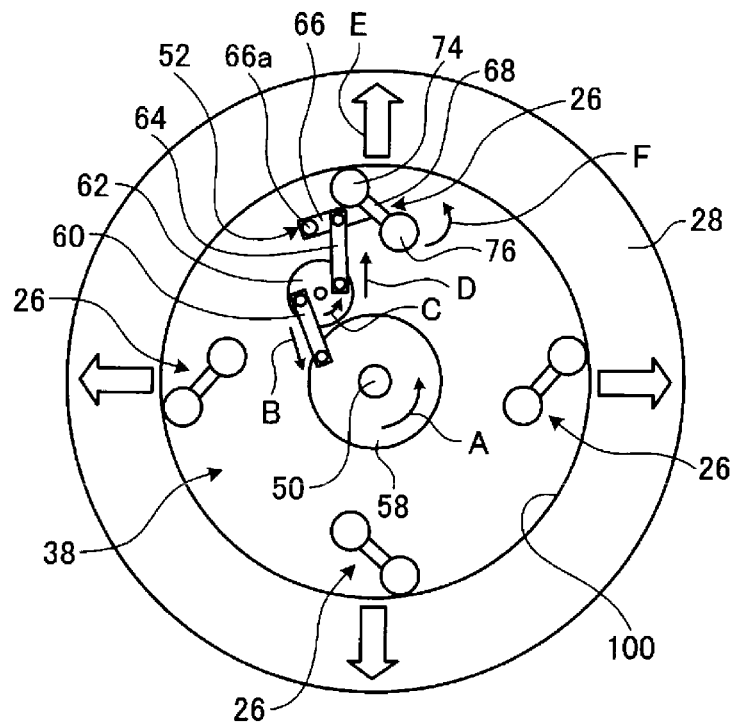
FIG. 10 is an explanatory diagram for explaining how contact members of a tire gripping device according to an embodiment move to a first contact stage.

First, as illustrated in FIG. 10, for the chuck portion body 38 to grip the tire 28, the chuck portion body 38 (chuck portion 38a and the chuck portion 38b) enters an opening portion 100 of the tire 28 defined by the inner side of the bead side in a state with a retracted diameter. Then, after the clutch portion 44 is disengaged, the gripping/rotation actuator 42 functioning as the first driving mechanism and the drive shaft 50 rotate at a predetermined angle the first link plate 58 in the direction of arrow A (counterclockwise direction). This rotation moves the first link arm 60 in the direction of arrow B, rotates the second link plate 62 in the direction of arrow C (counterclockwise direction), and moves the second link arm 64 in the direction of arrow D. As a result, the third link arm 66 swings about the bearing 66a outward in the radial direction of the tire 28 so that the first contact member 74 supported by the base plate 68 applies a force outward in the radial direction of the tire 28 (arrow E). This step is referred to as the first contact stage. As described above, the first contact member 74 is rotatably supported by the base plate 68. Thus, when the machine center position of the chuck portion body 38 and the center position of the tire 28 are not aligned, the first contact members 74 rotate, changing their relative position to the bead portion and moving (sliding) the tire 28 across the stopping station 14 (see FIG. 1). As a result, the chuck portion body 38 alleviates the stress concentration that occurs when the tire 28 is moved and corrects misalignment. Note that though omitted in FIG. 10, the spring 72 (see FIG. 3) puts the base plate 68 in the first orientation and keeps the second contact member 76 distanced from the bead portion (opening portion 100). In the first contact stage, the base plate 68 is configured so that the first contact member 74 comes into contact with the contact surface of the bead portion before the second contact member 76. In other words, in the center position alignment stage of the tire 28, the second contact member 76 that does not rotate (second contact member 76 in a state of non-relative movement) is prevented from coming into contact with the contact surface of the bead portion and deforming the tire 28.

Figure 11:
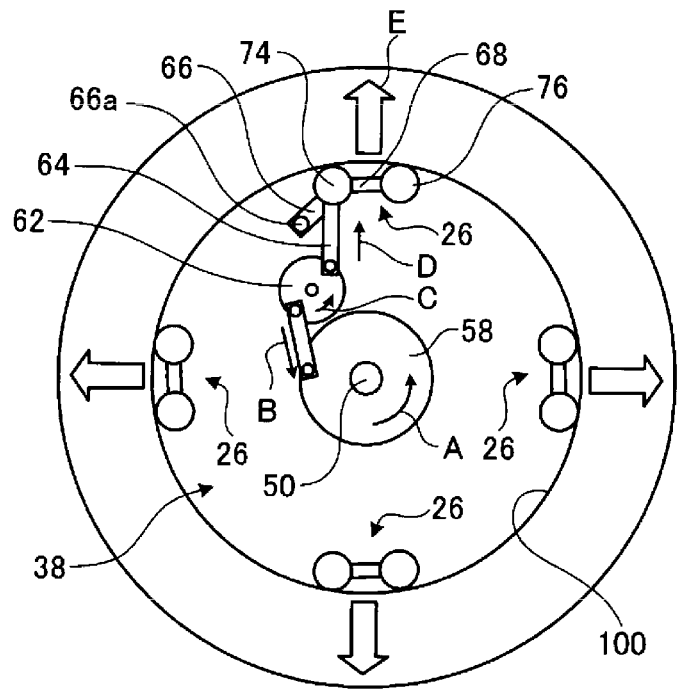
FIG. 11 is an explanatory diagram for explaining how contact members of a tire gripping device according to an embodiment move to a second contact stage.

Next, FIG. 11 will be used to describe how the base plate 68 (swinging member) changes to the second orientation, and gripping of the tire 28 in the radial direction is completed. The second orientation is an orientation subsequent to the first orientation illustrated in FIG. 10 entered into by the drive shaft 50 (first link plate 58) being rotated more. By the first link plate 58 being rotated more in the direction of arrow A, the first link arm 60 moves further in the direction of arrow B, the second link plate 62 rotates more in the direction of arrow C, and the second link arm 64 moves further in the direction of arrow D. Here, the first contact member 74 supported on the base plate 68 at one end is already in contact with the bead portion (opening portion 100). Then, the base plate 68 swings against the force of the spring 72 (see FIG. 4), and the second contact member 76 that does not rotate comes into contact with the bead portion (opening portion 100). As a result, a biasing force is applied outward in the tire radial direction (arrow R). This step is referred to as the second contact stage. As described above, in the first contact stage, the machine center position of the chuck portion body 38 and the center position of the tire 28 are substantially aligned (centered). Thus, the contact members 26 (second contact member 76), which are disposed substantially evenly apart, press against the inner diameter of the bead portion (opening portion 100) in a substantially even manner around the entire circumference. In other words, localized deformation does not occur in the tire 28, and the tire 28 can be firmly gripped.

FIG. 12 is a schematic diagram for explaining how after the base plate 68 of the chuck portion body 38 changes to the second orientation illustrated in FIG. 11, the contact members 26 expand in the width direction of the tire 28. In FIG. 12, the contact member 26 (first contact member 74, second contact member 76) supported on the chuck base plate 54 (chuck portion 38a) is illustrated on the right side, and the contact member 26 (first contact member 74a, second contact member 76a) supported on the chuck base plate 94 (chuck portion 38b) is illustrated on the left side. Additionally, the drawing is simplified with the tapered portion of the main portion 78 of the contact members 26 being omitted. The contact members 26 each include the flange portion 80 on one end of the main portion 78. Bead portions 102 each include a bead toe 102a on the inner side of the tire 28 and a bead heel 102b on the outer side of the tire 28. By bringing the main portions 78 into contact with the bead toe 102a, the flange portions 80 can easily be brought into contact with inner sides of the tire in the width direction at the bead portions 102. Additionally, the width expanding actuator 48, which functions as the second driving mechanism, and the drive shaft 48a (see FIG. 2) separate the chuck base plate 94 (see FIG. 8) that supports the first contact members 74a and the second contact members 76a from the chuck base plate 54. As a result, as illustrated in FIG. 12, the first contact members 74 and the second contact members 76 supported on the chuck base plate 54 and the first contact members 74a and the second contact members 76a supported on the chuck base plate 94 are separated from one another, and the tire 28 expands in the width direction. Note that a bundled bead wire 102c such as steel wire is located at the inner portion of the each of the bead portions 102. By suitably selecting the size of the flange portion 80, the engagement between the bead toe 102a of the bead portions 102 and the flange portions 80 can be stabilized, and smooth expanding can be achieved.

As described above, the tire gripping device 16 grips the tire 28 while carrying out centering via two stages: the first contact stage and the second contact stage. Then, while maintaining the tire 28 in a gripped state, the tire 28 is expanded in the tire width direction. As a result, the gripped tire 28 is supported in a well-balanced manner about the center position of the tire 28 with substantially even pressure (gripping force) outward in the radial direction. Additionally, localized deformation (bending) caused by gripping can be suppressed. Furthermore, the side surfaces of the tire 28 deform under their own weight resulting in tires 28 of the same type having different shapes. This affects the accuracy of inspection. In the chuck portion body 38 of the present embodiment, the contact members 26 expand in the tire width direction while in a gripping orientation in the radial direction. Thus, the degree to which the side surfaces of the tire 28 are curved can be corrected. Additionally, by expanding the width of the tire 28 to a design value, uniform measurement conditions for the inspection unit 18 can be achieved and the state of the detection surface (inspection surface) can be made uniform. As a result, noise included in the inspection image (tire image) captured by the inspection unit 18 can be reduced, and thus inspection accuracy can be improved.

Figure 13:
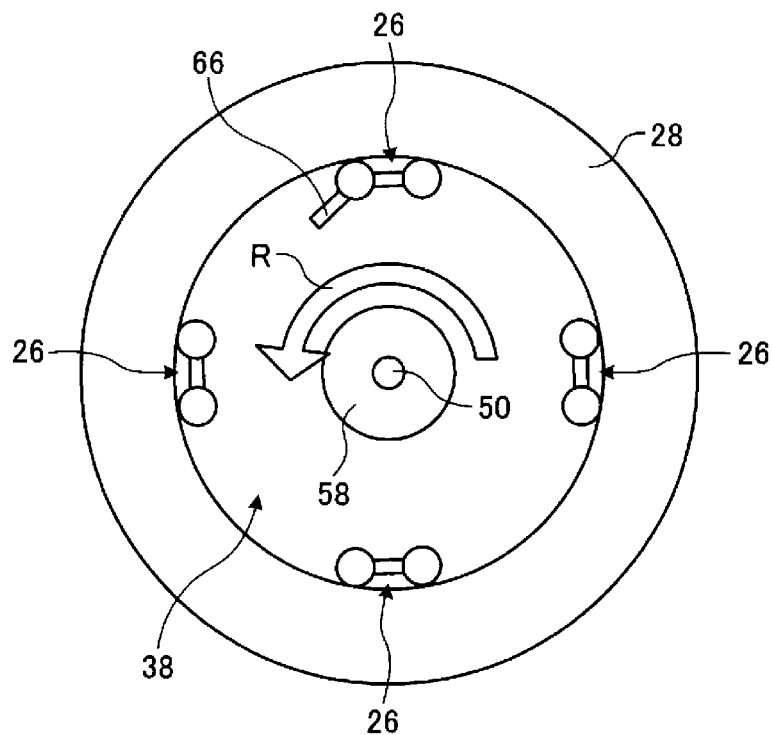
FIG. 13 is an explanatory diagram for explaining how a chuck portion body (chuck portion) of a tire gripping device according to an embodiment rotates about a center axis together with a tire.

FIG. 13 illustrates the tire 28 after gripping/expanding by the contact members 26 is completed being rotated together with the chuck portion body 38 for inspection by the inspection unit 18. When the gripping/expanding of the tire 28 by the contact members 26 is completed, the clutch portion 44 (see FIG. 9) is switched to the engaged state, and the driving force of the gripping/rotation actuator 42 is transmitted via the rotation main shaft 90 to the chuck base plate 94 and the chuck base plate 54. As a result, the tire 28 can be rotated in the direction of arrow R, for example, at a predetermined speed with the chuck portion body 38 maintained in the gripping state.

The three, for example, imaging portions (imaging devices) that constitute the inspection unit 18 image the tread surface and both side surfaces of the rotating tire 28, and inspect the tire 28 for shape, surface damage, and fouling. Note that a level difference and designs such as splices and pladers may be located on the inner surface of the tire 28. Thus, a method in which a gripping portion of a chuck device itself, for example, is the drive source of tire rotation, may encounter vibrations caused whenever the gripping portion passes over the portion where the splice or plader is located. In other words, the quality of the inspection image may be reduced by the vibrations. However, the chuck portion body 38 of the present embodiment grips the tire 28 and rotates as a whole while gripping the tire 28. Thus, splices and pladers do not cause vibrations. For this reason, the quality and accuracy of inspection can be improved.

Figure 14:
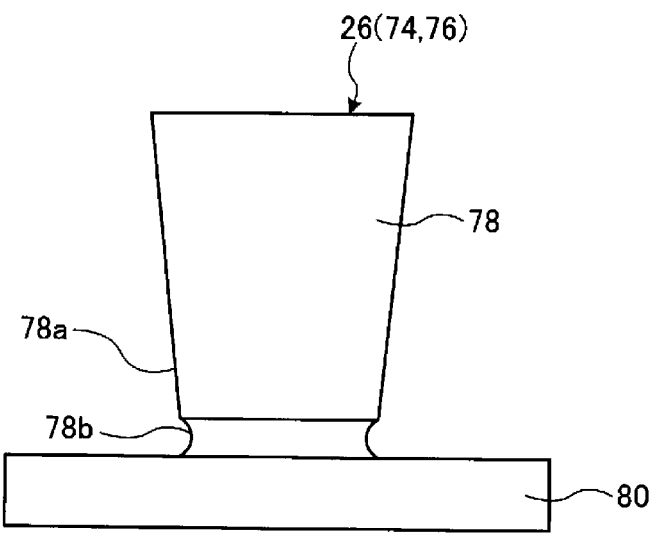
FIG. 14 is a schematic side view for explaining the recess shape in contact members of a tire gripping device according to an embodiment.

As described above, the members of the chuck portion body 38 in direct contact with the tire 28 are the contact members 26. Sheets of rubber material including fiber and metal wire are wound in an annular manner to form the tire 28, and in forming the tire 28, a burr may remain on an open end portion such as the tip of a bead portion. Such burrs coming into contact with the contact members 26 may cause deviation in the gripping orientation. As such, the contact members 26 of the present embodiment, as illustrated in FIG. 14 include a recess portion for accommodating (housing) a burr if one is located on the tip of the bead portion. The recess portion may be a small diameter portion 78b with a smaller diameter than a tapered portion 78a, which is the side surface of the main portion 78. In embodiments in which a recess portion is provided on the main portion 78, the major portion of the end surface of the bead portion comes into contact with the tapered portion 78a (portion with a large diameter, non-recess portion) of the main portion 78. The burr projecting from the end surface of the bead portion (end portion in the tire radial direction) fits into the recess portion of the small diameter portion 78b. As a result, the contact between the end surface of the bead portion and the side surface portion of the main portion 78 is not affected. Additionally, by the small diameter portion 78b being provided as illustrated in FIG. 14, the receiving effect of the burr on the bead portion is improved, and the engagement strength provided by the flange portion 80 when the tire 28 expands in the width direction can be improved and the reliability of the width expanding movement can be improved. Note that in embodiments formed with the tapered portion 78a, the taper angle preferably ranges from approximately 5° to 9°, this range having been confirmed via numerous experiments. By providing the tapered portion 78a with such a taper angle, the tip of the bead portion can be smoothly guided to its position on the flange portion 80.

Figure 15:
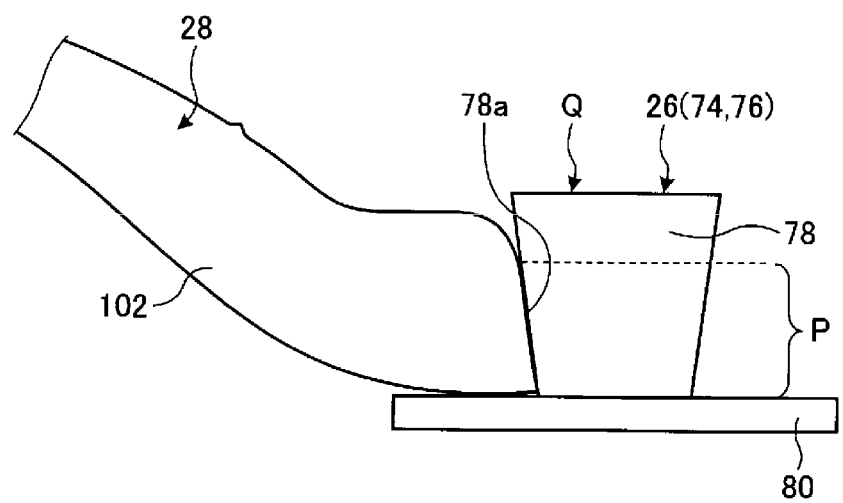
FIG. 15 is an explanatory diagram for explaining how contact members of a tire gripping device according to an embodiment are brought into contact with a bead portion.

FIG. 15 is an explanatory diagram for explaining how the bead portion and the contact members 26 come into contact. Note that in FIG. 15, the small diameter portion 78b of FIG. 14 is omitted. Depending on the type of the tire 28, the bead portion 102 may have various shapes. In the present embodiment, the tapered portion 78a that accommodates the burr on the bead portion 102 enables inconsistencies caused by the difference in shapes of the tip portion of the bead portion 102 of the various types of the tire 28 to be compensated for, and thus reliable engagement and gripping can be achieved. Note that the contact members 26 may be the same regardless of the type of the tire 28, the shape of the tapered portion 78a may be the same, and the taper angle may be changed to correspond to the type of the gripped tire 28. This allows for a snugger contact between the bead portion and the contact members 26, and thus the gripping properties can be improved.

Figure 16:
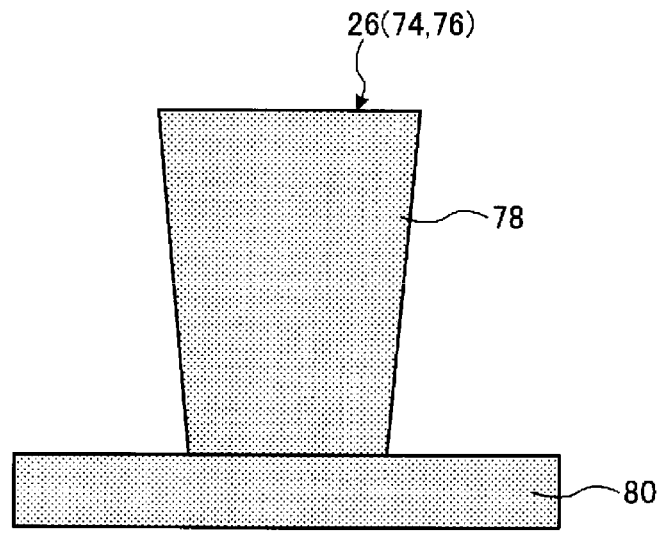
FIG. 16 is a schematic side view of a contact member of a tire gripping device according to an embodiment in which the contact members are treated for reflection suppression.

The inspection unit 18 of the present embodiment images the surface of the tire 28 with the imaging portion while illuminating the tire 28 with the light irradiation portion. The light irradiation portion, for example, employs a laser light sheet. In such an embodiment, spot illumination of the tire 28 only is difficult, and the laser light sheet illuminates portions other than the tire 28 such as the contact members 26 directly in contact with the tire 28. As a result, the light reflected by the contact members 26 may enter the imaging area when the tire 28 is imaged. When reflected light is included in the captured image, noise is produced. As such, in the present embodiment as illustrated in FIG. 16, the surface of the main portion 78 of the contact members 26 is treated for reflection suppression. The reflection suppressing treatment can, for example, employ a surface treatment using black chrome plating. By treating the contact members 26 for reflection suppression, the amount of noise caused by reflected light in the inspection image captured by the inspection unit 18 can be reduced, and thus the inspection accuracy maintained or improved. Note that the reflection suppressing treatment is not limited to black chrome plating, and the same effect can be obtained via application of a coating material able to suppress reflection, forming a film, or surface processing treatment to suppress diffused reflection. The reflection suppressing treatment may be applied to all of the contact members 26 (side surface of the main portion 78, the upper surface where the flange portion 80 is not connected, and the flange portion 80), or may be applied to only the portions of the main portion 78 (side surface and upper surface) due to the flange portion 80 hiding on the inner side of the bead portion of the tire 28.

Figure 17:
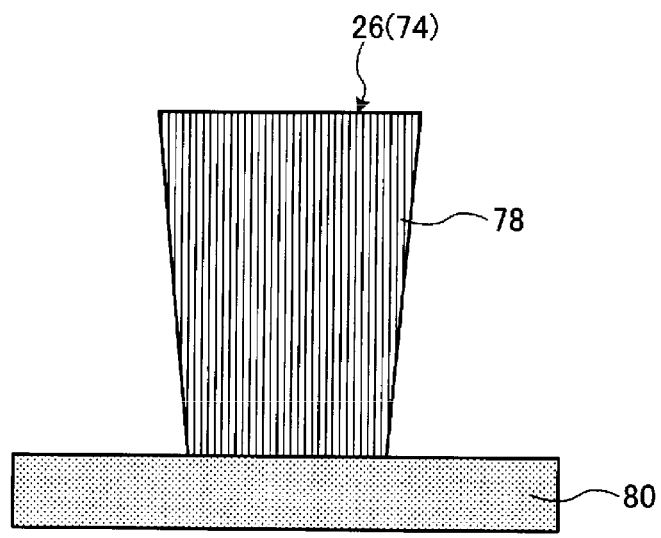
FIG. 17 is a schematic plan view of a contact member of a tire gripping device according to an embodiment in which the contact members are processed to provide rotation guidance.

FIG. 17 illustrates another embodiment of the contact members 26. As described above, the first contact member 74 of the contact members 26 in the first contact stage is brought into contact with the bead portion in a manner allowing for relative movement. Thus, deformation of the tire 28 caused by stress concentration is suppressed. As such, the first contact member 74 of the present embodiment, as illustrated in FIG. 17, has the surface of the main portion 78 of the freely rotatable first contact member 74 processed to provide rotation guidance. An example of rotation guidance processing is illustrated in FIG. 17. In this example, the side surface portion of the main portion 78 that comes into contact with the bead portion includes corrugated grooves formed in the direction orthogonal to the rotation direction of the first contact member 74. Other examples of the rotation guidance processing include forming an irregular corrugated portion, and processes for increasing the surface roughness (processes for reducing the smoothness of the surface, processes for reducing the smoothness via a coating of resin such as a rubber material). Note that the corrugated groove and the corrugated portion may be provided when the main portion 78 is formed, or provided via processing after the main portion 78 is formed. Additionally, by carrying out the rotation guidance processing on the main portion 78 of the first contact members 74, rotation of the first contact members 74 is made reliable. As a result, the second contact members 76 are prevented from swinging toward (coming into contact with) the bead portion at a predetermined timing (after centering of the tire 28). Note that in embodiments in which rotation guidance processing is carried out on the main portion 78 of the first contact members 74, depending on the type of the processing, there is a possibility of diffused reflection occurring when light from the light irradiation portion is incident on the main portion 78. In other words, this may cause noise in the inspection image. As such, as illustrated in FIG. 15, preferably testing is performed to find a contact region P of the bead portion 102 and the main portion 78 of the first contact member 74 beforehand, rotation guidance processing is carried out only in the contact region P, and other portions (an end surface Q of the first contact member 74 and the flange portion 80) are treated for reflection suppression.

Figure 18:
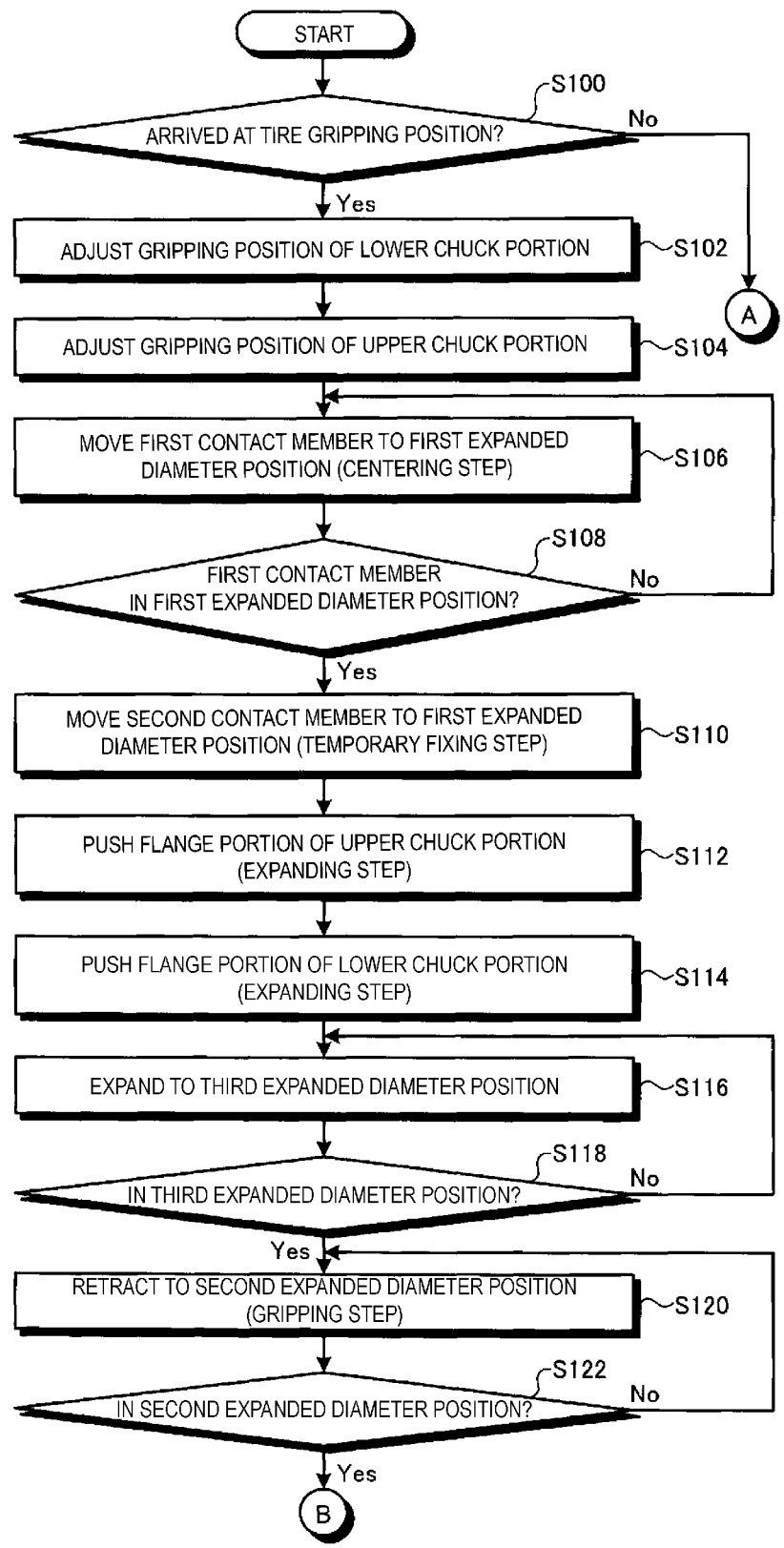
FIG. 18 is a flowchart for explaining the first half of the operation of a tire inspection device according to an embodiment.
Figure 19:
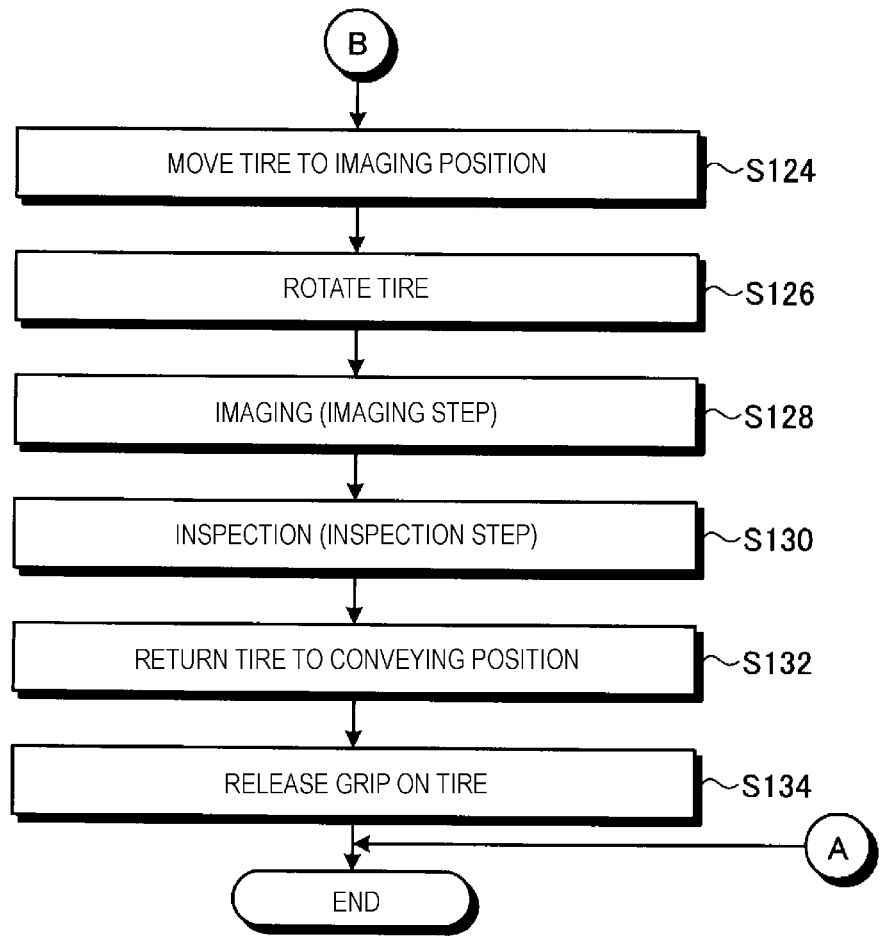
FIG. 19 is a flowchart for explaining the second half of the operation of a tire inspection device according to an embodiment.

Next, the inspection process of the tire 28 using the tire inspection device 10 will be described using FIGS. 1, 18, and 19, and the gripping process of the tire 28 by the chuck portion body 38 will be described using FIGS. 20 to 25. Note that the tire inspection device 10 rotates the chuck unit 20 downward 90° from the state illustrated in FIG. 1 to put the chuck portion 38a (chuck base plate 54) on the lower side of the chuck unit 20 on standby for receiving the tire in an inspection starting orientation opposing the conveying surface of the stopping station 14.

Figure 20:
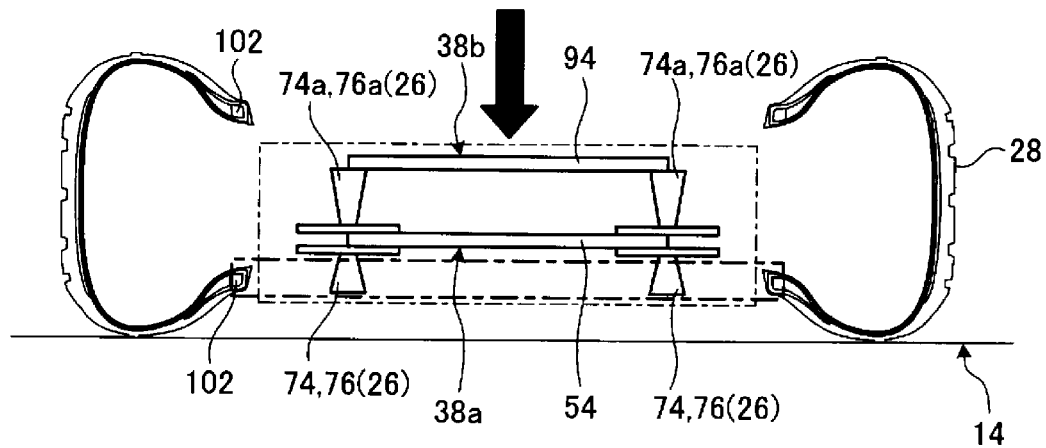
FIG. 20 is an explanatory diagram for explaining a gripping process of a tire performed by a tire gripping device according to an embodiment.
Figure 21:
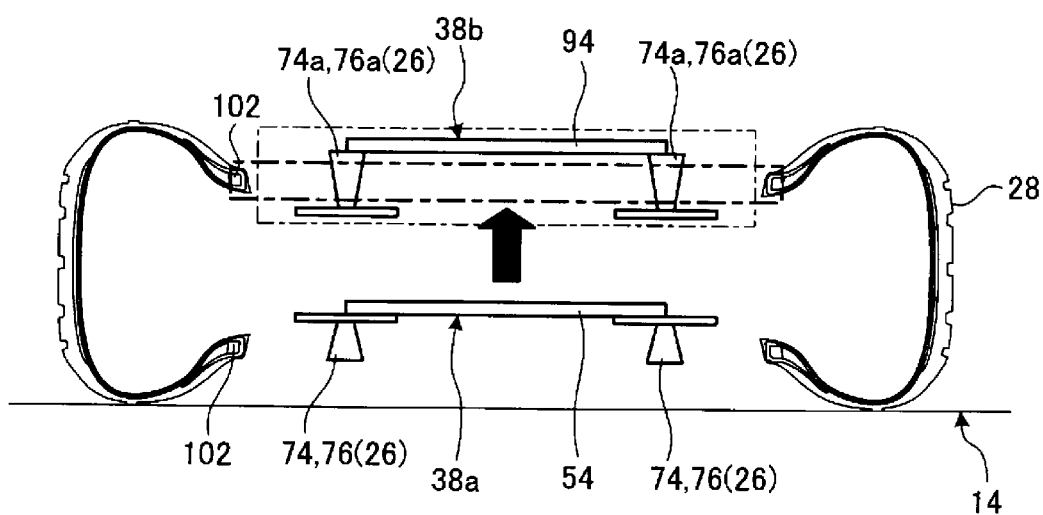
FIG. 21 is an explanatory diagram for explaining a gripping process of a tire performed by a tire gripping device according to an embodiment.

The control portion of the tire inspection device 10 is activated to cause the CPU to load a control program from the ROM to the RAM and execute the loaded program, which causes the following control to be performed. The control portion of the tire inspection device 10 executes a process of determining whether or not the tire 28 to be inspected has arrived at the tire gripping position of the stopping station 14 from the previous step on the basis of a signal from a sensor (not illustrated) disposed near the stopping station 14 (S100). When the tire 28 has not arrived at the tire gripping position (No in S100), the flow is temporarily stopped until the tire 28 arrives at the tire gripping position. In S100, when the tire 28 is confirmed by a signal from a sensor to have arrived at the tire gripping position (Yes in S100), as illustrated in FIG. 20, the control portion executes a process of gripping position adjustment for the lower chuck portion 38a (chuck base plate 54) (S102). Note that this adjustment is for enabling the contact members 26 that support the chuck base plate 54 (first contact members 74) to come into contact with the bead toe 102a (open end portion of the bead portion 102 on the inner side of the tire 28) of the bead portion 102 on the side proximal to the stopping surface of the stopping station 14. This adjustment is executed by the elevator mechanism 22 moving the entire chuck unit 20 toward the stopping surface of the stopping station 14. The movement control amount may be executed after detecting the distance from the chuck base plate 54 to the stopping surface of the stopping station 14 or to the lower bead portion 102 (on the stopping station 14 side), or the lowering distance to the stopping surface of the stopping station 14 may be determined beforehand by testing and the like. Following on, as illustrated in FIG. 21, the control portion executes a process of gripping position adjustment for the upper chuck portion 38b (chuck base plate 94) (S104). Additionally, this adjustment is for enabling the contact members 26 that support the chuck base plate 94 (first contact members 74a) to come into contact with the bead toe 102a (open end portion of the bead portion 102 on the inner side of the tire 28) of the bead portion 102 on the side distal from the stopping surface of the stopping station 14. This adjustment can be executed by the width expanding actuator 48 separating (expanding in the width direction of the tire 28) the chuck base plate 94 from the chuck base plate 54. The expansion control amount can be determined by measuring beforehand the distance between the opposing bead portions 102 in the width direction of the tire 28 to be inspected. Additionally, the expansion control amount may be determined after a sensor detects the position of the bead toe 102a of the bead portions 102.

Figure 22:
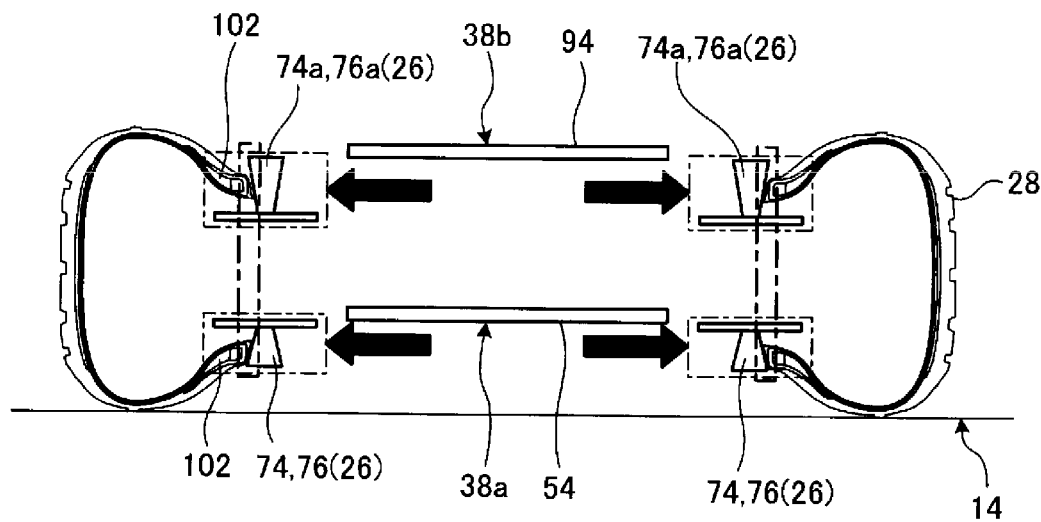
FIG. 22 is an explanatory diagram for explaining a gripping process of a tire performed by a tire gripping device according to an embodiment.

Next, as illustrated in FIG. 22, the contact members 26 of the chuck portion 38a (chuck base plate 54) and the chuck portion 38b (chuck base plate 94) are moved to the first contact stage. In other words, the main portion 78 of the contact members 26 are expanded to a first expanded diameter position and put in the state illustrated in FIG. 10 (S106). Additionally, the first contact members 74 (74a) and the bead portion 102 are brought into contact in a manner allowing for relative movement, and centering of the tire 28 is executed (centering step). Movement to the first expanded diameter position is executed by rotational control of the first link plate 58 by the gripping/rotation actuator 42 (No in S108). When the control portion determines that the first contact members 74 (74a) have reached the first expanded diameter position (Yes in S108), or in other words when centering of the tire 28 is completed, the state of contact of the contact members 26 is moved to the second contact stage. In other words, the control portion executes a process of moving the second contact members 76 (76a) to the first expanded diameter position (S110) to complete the relative movement of the main portions 78 of the contact members 26 and the bead portion 102 (end portion in the tire radial direction). Here, the control portion executes a process of further rotating the first link plate 58 in the link expansion direction via the gripping/rotation actuator 42. As described above, the second contact members 76 (76a) come into contact with the bead portion 102 in a state of non-relative movement, thus relative between the two stops. As a result, the tire 28 having been centered with the chuck portion body 38, is temporarily fixed (temporarily gripped) by the second contact members 76 (76a) (temporary fixing step). Note that the movement of the contact members 26 to the first expanded diameter position is not for the purpose of gripping the tire, and instead for the main purpose of centering the tire 28 with the chuck portion body 38. Accordingly, the control amount of the gripping/rotation actuator 42 is less than the control amount when the tire 28 is gripped with a final gripping force. Whether the movement to the first expanded diameter position is completed or not may be detected via the actual movement amount of the first contact members 74, 74a or the second contact members 76, 76a. Additionally, the torque value of the gripping/rotation actuator 42 may be detected. In embodiments in which the movement amount is detected on the basis of torque, the contact members 26 can be determined to have completed moving to the first expanded diameter position when the torque reaches from 6 to 8 kgf, for example.

Figure 23:
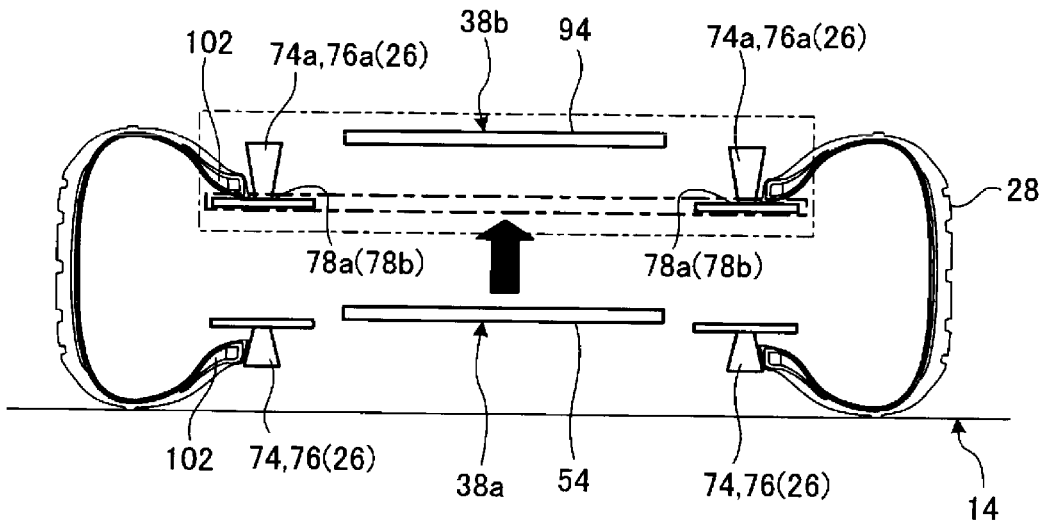
FIG. 23 is an explanatory diagram for explaining a gripping process of a tire performed by a tire gripping device according to an embodiment.

Next, with the tire 28 held in a temporarily gripped state (centered state) by the contact members 26 expanded in the radial direction, the control portion of the tire inspection device 10 executes a process of pushing the flange portions 80 of the contact members 26 of the chuck portion 38b (chuck base plate 94) against the bead toe 102a of the upper bead portion 102 (S112). In other words, as illustrated in FIG. 23, a step of expanding the upper chuck portion 38b is executed whereby the chuck base plate 94 is separated a predetermined distance from the chuck base plate 54 via the driving force of the width expanding actuator 48. By raising the chuck portion 38b (chuck base plate 94), the dead weight of the tire 28 acts to push the bead toe 102a of the bead portion 102 into the recess portions (tapered portions 78a, small diameter portion 78b) formed in the first contact members 74a and the second contact members 76a. In other words, relative expansion movement in the width direction of the tire 28 together with the contact state (gripping state) is improved. Here, the expansion in the tire width direction (bead width direction) by the flange portions 80 of the first contact members 74a and the flange portions 80 of the second contact members 76a of the chuck portion 38b cause the tire 28 to be in an almost floating state above the stopping station 14. As a result, the ground contact area of the tire 28 is reduced and deformation due to its dead weight is alleviated, and because the contact state of the main portions 78 of the first contact members 74 and the main portions 78 of the second contact members 76 of the chuck portion 38a is maintained, the tire 28 can be kept in a centered state.

Figure 24:
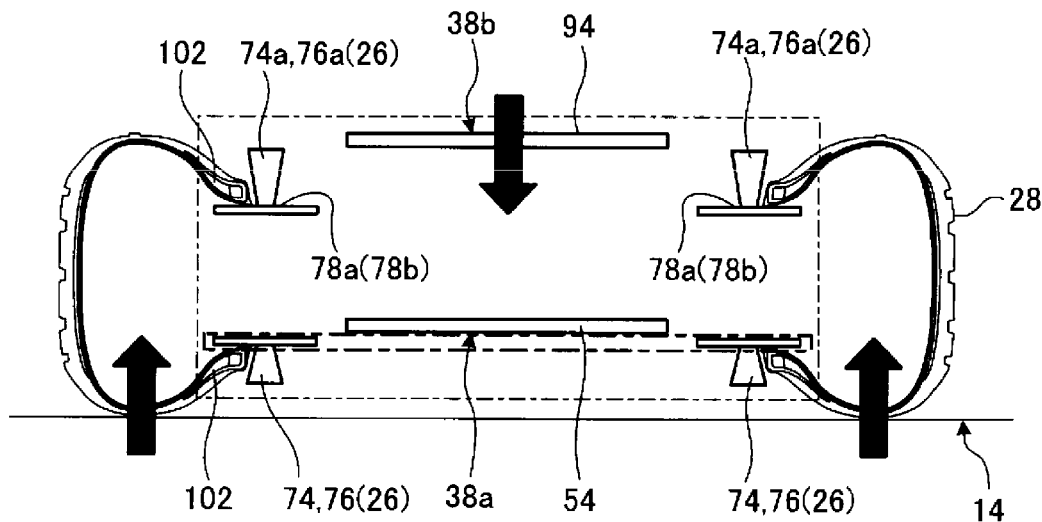
FIG. 24 is an explanatory diagram for explaining a gripping process of a tire performed by a tire gripping device according to an embodiment.

Next, the control portion of the tire inspection device 10 executes a process of pushing the flange portions 80 of the contact members 26 of the chuck portion 38a (chuck base plate 54) against the bead toe 102a of the lower bead portion 102 (S114). Here, as illustrated in FIG. 24, a process of expanding the lower chuck portion 38a in which the elevator mechanism 22 (see FIG. 1) is used to lower the entire chuck unit 20 a predetermined amount toward the stopping station 14 is executed. By lowering the chuck portion 38a (chuck base plate 54), the bead toe 102a of the bead portion 102 is pushed into the recess portions (tapered portions 78a, small diameter portion 78b) formed in the first contact members 74 and the second contact members 76. In other words, while maintaining the bead portion of the tire 28 expanded in the width direction (maintaining an expanded state), the contact state (gripping state) is improved. Here, the bead toe 102a of the bead portion 102 fits into the recess portions (tapered portion 78a, small diameter portion 78b) of the first contact members 74a and the second contact members 76a of the chuck portion 38b, thus the contact state is maintained. In such a manner in the expanding step, the pair of chuck portions 38a, 38b are moved outward in the width direction of the tire 28, and the bead toes 102a (inner end portions in the tire width direction) of the bead portions 102 are spread outward in the width direction of the tire 28 at the flange portions 80.

Figure 25:
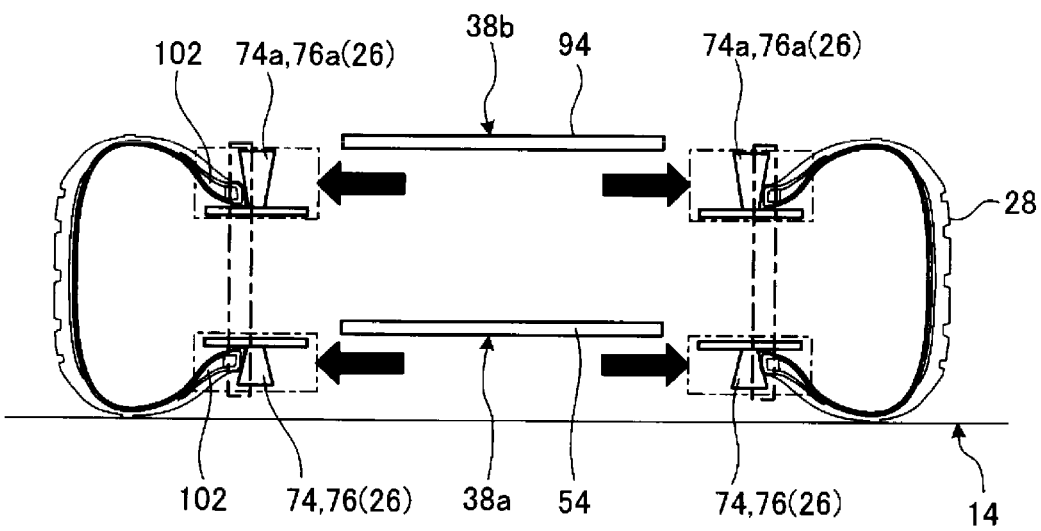
FIG. 25 is an explanatory diagram for explaining a gripping process of a tire performed by a tire gripping device according to an embodiment.

As described above, the bead toes 102*a* of the bead portions 102 are pushed into the recess portions (small diameter portions 78*b*) of the main portions 78 of the contact members 26. This minutely decreases the gripping force (pressure) acting outward in the radial direction from the contact members 26. Additionally, there may be variation in the gripping force caused by variation in how the bead toes 102*a* are fit into the recess portions. As such, as illustrated in FIG. 25, as the final stage of gripping, the control portion executes a process of again pressing the contact members 26 outward in the radial direction of the tire 28. In other words, when the final required gripping force if set to 10 kgf, for example, gripping is performed with a gripping force greater than this (for example, 14 kgf), and then the gripping force is decreased to the final required gripping force and stabilized. Specifically, the contact members 26 are temporarily moved to a third expanded diameter position with a larger diameter than that of the second expanded diameter position (second expanded diameter position having a larger diameter than that of the first expanded diameter position) associated with the final required gripping force (S116). Movement to the third expanded diameter position is executed by rotational control of the first link plate 58 by the gripping/rotation actuator 42 (No for S118). Whether or not movement to the third expanded diameter position has been performed can be determined from the movement amount of the contact members 26 or the control torque of the gripping/rotation actuator 42. When the contact members 26 have been determined to have reached the third expanded diameter position (Yes in S118), the control portion executes a process of reducing the diameter of the contact state of the contact members 26 to the second expanded diameter position (S120). When the gripping/rotation actuator 42 is controlled to complete retraction to the second expanded diameter position (No in S122) and this completion is confirmed via the movement amount or control torque of the contact members 26 (Yes in S122), the control portion executes a process of moving the tire 28 to the imaging position (S124).

Movement to the imaging position of the gripped tire 28 is executed by raising the chuck unit 20 with the elevator mechanism 22 and rotating the chuck unit 20 90° with the rotation mechanism 24 (see FIG. 1). When the tire 28 is confirmed by a sensor to have been moved to the imaging position, the control portion executes a process of switching the clutch portion 44 to the engaged state and rotating the chuck portion body 38 at a predetermined speed via driving force of the gripping/rotation actuator 42 (S126). Then, the inspection unit 18 irradiates the rotating tire 28 with inspection light from the light irradiation portion and images the tread surface and both side surfaces of the tire 28 with the imaging portion (imaging step S128). The tire inspection device 10 analyses the inspection image of the tread surface and both side surfaces of the imaged tire 28 in a predetermined order, and inspects the quality of the tire 28 (inspection step S130).

The control portion switches the clutch portion 44 to the disengaged state after the tire 28 is inspected for quality or concurrently with the inspection. Then, the chuck unit 20 is lowered by the elevator mechanism 22 and rotated 90° by the rotation mechanism 24 to return the tire 28 to the tire stopping position on the stopping station 14 (S132). After the tire 28 is confirmed by a sensor to have arrived at the stopping station 14, the contact members 26 are retracted to the position with the smallest diameter as illustrated in FIG. 3 by the gripping/rotation actuator 42, and the tire 28 is released (S134).

When the inspection result shows that the tire 28 released from the chuck unit 20 is of good quality, the control portion of the tire inspection device 10 executes a process of transferring the tire 28 from the stopping station 14 to a conveyor for good quality products downstream of the stopping station 14. When the inspection result is that the tire 28 does not meet the quality standards, a process of turning on an error display light on the tire inspection device 10 and transferring the tire 28 to a discharge conveyor different from the conveyor for good quality products is executed. Note that regardless of the quality, the inspection results are preferably sent to a management device as product data. The inspection results of defective products may be successively displayed on the display device 1002 (see FIG. 1) provided on the tire inspection device 10.

In such a manner, according to the tire inspection device 10 provided with the tire gripping device 16 of the present embodiment, when the bead toe 102*a* of the bead portion 102 of the tire 28 (open end portion of the bead portion 102 on the inner side of the tire 28) is in contact with and gripped by the contact members 26, deformation of the tire 28 can be reduced or suppressed. As a result, noise caused by deformation of vibrations due to the tire 28 being gripped can be suppressed, and the inspection accuracy of the tire 28 can be improved.

Figure 26:
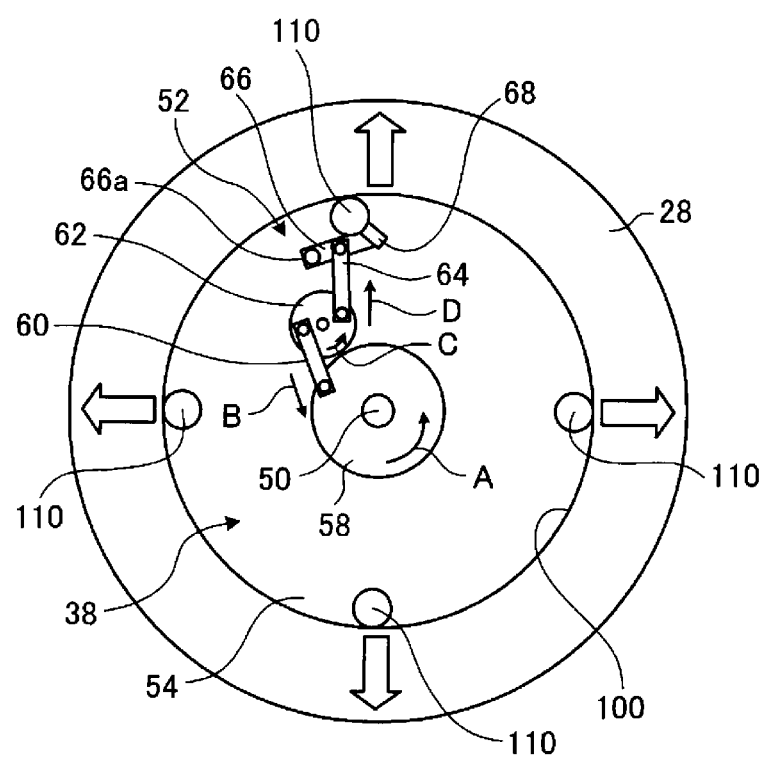
FIG. 26 is an explanatory diagram for explaining a modified example of contact members of a tire gripping device according to an embodiment.

Note that in the embodiment described above, the contact members 26 provided on the chuck base plate 54 and the chuck base plate 94 of the chuck portion bodies 38 include a rotating type, the first contact members 74, and a fixed type, second contact members 76. In another embodiment, as illustrated in FIG. 26, only one type, contact member 110, may be used. Note that the configuration of components other than the contact member 110, such as the link mechanisms 52 and the chuck base plate 54, is essentially the same as described using FIG. 11, and the description of the link mechanisms 52 and the chuck base plate 54 and their movements will be omitted. The contact members 110 illustrated in FIG. 26 each include a rotatable main portion with a brake. The brake can be an electromagnetic brake, for example, but is not limited thereto. In embodiments including the contact member 110, in the first contact stage, the contact member 110 is put in a state allowing for relative movement, with the brake being released and the contact member 110 being allowed to rotate. In other words, the contact member 110 functions in a similar manner to the first contact member 74 (74*a*) described above. In the second contact stage, the contact member 110 is put in a state of non-relative movement with the braking force being applied, preventing rotation. In other words, the contact member 110 functions in a similar manner to the second contact member 76 (76*a*) described above. As a result, the same effects as the embodiment described above can be achieved.

Additionally, another embodiment includes a first contact member and a second contact member with functions that differ from that of the contact members 26 described using FIG. 11. In such an embodiment, the first contact member and the second contact member are fixed to the base plate 68, which is a swinging member. In other words, the first contact member does not have a self-rotation mechanism. Instead, to achieve a state in which relative movement is allowed, the non-rotational first contact member includes a surface portion with a static friction coefficient less than that of a surface portion of the non-rotational second contact member. In other words, the non-rotational first contact member in the first contact stage can be put in a state allowing for relative movement with the bead portion by sliding against the bead portion. This alleviates the stress concentration when pressure is applied, and suppresses localized deformation (bending) of the tire 28. The non-rotational second contact member with a static friction coefficient greater than that of the surface portion of the first non-rotational contact member is in contact in a state of non-relative movement with the bead portion without sliding against the bead portion, and thus achieves the desired gripping force. Note that the static friction coefficient of the non-rotational first contact member and the second contact member can be suitably selected depending on the surface treatment of the surface portion of each contact member. For example, the static friction coefficient can change depending on adjustment of the surface roughness or surface covering material.

Additionally, in the embodiments described above, the external shape of the contact members 26 is a truncated cone. These embodiments employ a truncated cone shape because it provides the contact members 26 with a contact state that is resistant to change when the inch size of the tire 28 to be inspected changes or when the curvature of the open end portion of the bead portion 102 changes. However, the external form of the contact members 26 is not limited thereto, and any shape that facilitates allowing for a good state of relative movement with the bead portion can be employed for the first contact member. In a similar manner, the second contact member preferably has a shape that facilitates a state of non-relative movement between it and the bead portion.

Additionally, in the present embodiment described above, the number of link mechanisms 52 provided on the chuck base plate 54 and the chuck base plate 94 is four because this number allows a sufficient effect to be obtained and it makes it easy to explain the structure, however the number of link mechanisms 52 can be suitably selected. With a larger number of link mechanisms 52, the dispersion efficiency of the pressure when the diameter is expanded is good and the deformation suppression effect when the tire 28 is gripped is improved. However, when the number of link mechanisms 52 disposed on the chuck base plate 54 (94) is increased, the size of each of the link mechanisms 52 is decreased and rigidity is decreased, leading to a decrease in the durability of the device. With a smaller number of link mechanisms 52 disposed, each link mechanisms 52 can be made larger, thus making rigidity easier to be ensured. However, the dispersion efficiency of the pressure is decreased, leading to a decrease in the deformation suppression effect when the tire 28 is gripped. Accordingly, the number of the link mechanisms 52 is preferably selected taking into account the deformation suppression effect when the tire 28 is gripped, durability, and the like.

Additionally, in the present embodiment describe above, the contact members 26 are expanded and retracted using the link mechanisms 52. In an embodiment in which the link mechanisms 52 are employed, responsiveness to the drive of the gripping/rotation actuator 42 is good and smooth expansion and retraction can be achieved. However, other mechanisms can be employed for the expansion and retraction of the contact members 26. For example, a gear mechanism can be employed to expand and retract the contact members 26 to achieve the same effects of the present embodiment. Note that the configuration of the link mechanisms 52 can obtain the same effects with the expansion and retraction of the contact members 26 being changeable as appropriate.

Additionally, in the present embodiment, by the clutch portion 44 being employed, the expansion and retraction of the contact members 26 and the rotation of the entire chuck portion body 38 is achieved by the gripping/rotation actuator 42. However, different actuators may be employed for the expansion and retraction of the contact members 26 and the rotation of the chuck portion body 38.

The tire gripping device 16 of the present embodiment includes a chuck mechanism and the driving mechanism, for example. The chuck mechanism, for example, can include the pair of chuck portion bodies 38 adjacent in the width direction on which the plurality of contact members 26 are disposed in a circumferential manner. The contact members 26 can be brought into contact with the open end portion of the bead portion 102 of the tire 28, enter a state allowing for relative movement with the contact surface of the open end portion in the first contact stage, and enter a state of non-relative movement with the contact surface in the second contact stage after the first contact stage. Additionally, the driving mechanism, for example, includes the first driving mechanism for moving the contact members 26 in the radial direction of the tire 28 and the second driving mechanism for moving the pair of chuck portion bodies 38 in the width direction of the tire 28. According to this embodiment, for example, when the contact members 26 are brought into contact with and grip the open end portion of the bead portion 102 of the tire 28, the deformation of the tire 28 is reduced or suppressed.

Additionally, the contact members 26 of the tire gripping device 16 of the present embodiment, for example, may include a first contact member 74 (74a) that is brought into contact with the contact surface in the first contact stage and enters a state allowing for relative movement and a second contact member 76 (76a) that is brought into contact with the contact surface after the first contact member 74 (74a) in the second contact stage and enters a state of non-relative movement. According to this embodiment, for example, the first contact member 74 (74a) that enters a state allowing for relative movement is brought into contact first before the second contact member 76 (76a) that enters a state of non-relative movement. This can effectively reduce or suppress the deformation of the tire 28.

Additionally, the first contact member 74 (74a) and the second contact member 76 (76a) of the tire gripping device 16 of the present embodiment, for example, are supported by a swinging member (base plate 68). The swinging member (base plate 68) may be configured to be able to adopt a first orientation in which the first contact member 74 (74a) is brought into contact with the contact surface before the second contact member 76 (76a) and a second orientation in which the second contact member 76 (76b) is brought into contact with the contact surface. According to this embodiment, the first contact members 74 (74a) that are brought into contact in a state allowing for relative movement are brought into contact with the contact surface before the second contact members 76 (76a) that are brought into contact in a state of non-relative movement, the tire 28 is centered and then gripped by the second contact members 76 (76a). As a result, the deformation of the tire 28 can be effectively reduced or suppressed.

Additionally, the first contact member 74 (74a) of the tire gripping device 16 of the present embodiment, for example, may be provided with a self-rotation mechanism to achieve a state of allowing for relative movement. According to this embodiment, for example, the first contact members 74 (74a) can be smoothly moved in the circumferential direction relative to the contact surface, allowing for stress concentration when pressure is applied to be effectively alleviated and deformation of the tire 28 to be reduced or suppressed.

Additionally, the main portion 78 of the tire gripping device 16 of the present embodiment, for example, may have its surface processed to provide rotation guidance. According to this embodiment, for example, the rotatable first contact members 74 (74*a*) can be reliably put in a state allowing for relative movement. Also, by the first contact members 74 being able to rotate reliably, the contact of the second contact members 76 after the first contact members 74 can be prevented from swinging toward (coming into contact with) the bead portion before a predetermined timing (before centering of the tire 28 is completed).

Additionally, the contact members 26 of the tire gripping device 16 of the present embodiment, for example, may include a main portion 78 that is brought into contact with the bead portion 102 at an end portion in the tire radial direction, and a flange portion 80 connected to the main portion 78 that is brought into contact with bead portion 102 at the inner end portion in the tire width direction. According to this embodiment, for example, the bead portion 102 is pressed by the main portions 78 and the bead portion 102 is caught in the flange portions 80. This allows the pressure at the main portions 78 to be stabilized. Furthermore, the expansion of the tire 28 in the width direction by the flange portions 80 can be smooth and effective.

Additionally, the main portions 78 of the tire gripping device 16 of the present embodiment, for example, may include a recess portion (small diameter portion 78*b*) for accommodating the end portion in the tire radial direction disposed in the end portion region on the side where the flange portion 80 is connected. According to this embodiment, for example, the main portion 78 can smoothly guide the tip of the bead portion 102 to the position of the flange portion 80. Furthermore, the recess portion can reliably accommodate any burrs formed on the tip of the bead portion 102, and thus grip stability of the bead portion 102 can be improved.

Additionally, the main portion 78 of the tire gripping device 16 of the present embodiment, for example, may have its surface treated for reflection suppression. According to this embodiment, the light reflected of the contact members 26 can be suppressed, and light reflected of the contact members 26 can be prevented from being included as noise in the inspection image captured for inspection.

Additionally, the first contact member 74 (74*a*) of the tire gripping device 16 of the present embodiment, for example, may include a surface portion with a smaller static friction coefficient than that of the surface portion of the second contact member 76 (76*a*) to achieve a state of allowing for relative movement. According to this embodiment, by employing a simple configuration without a self-rotation mechanism, for example, the first contact members 74 (74*a*) can be smoothly moved in the circumferential direction relative to the contact surface, allowing for stress concentration when pressure is applied to be effectively alleviated and deformation of the tire 28 to be reduced or suppressed.

Additionally, the driving mechanism of the tire gripping device 16 of the present embodiment, for example, may include the clutch portion 44 that switches between a state in which the power from the gripping/rotation actuator 42 (drive source) is transmitted to power gripping and a state in which the power is transmitted to power rotation. In the gripping power transmission state, for example, the power from the gripping/rotation actuator 42 is transmitted to power the contact members 26 to grip the tire 28. In the rotation power transmission state, for example, the power from the gripping/rotation actuator 42 is transmitted to rotate the tire 28 about the rotation axis with the tire 28 in an orientation in which the tire 28 is gripped by the contact members 26. According to this embodiment, for example, the drive source can be shared by switching between power for the contact members 26 to grip the tire 28 and power for the tire 28 to be rotated about the rotation axis with the tire 28 in an orientation in which the tire 28 is gripped by the contact members 26. As a result, the tire gripping device 16 can be made more compact and cost can be reduced.

Additionally, the tire inspection device 10 of the present embodiment includes the tire gripping device 16 described above, the imaging portion for capturing a tire image that includes at least the side surface of the tire 28, and an inspection portion for executing an inspection of the surface of the tire on the basis of the tire image. According to this embodiment, a process can be executed for quality control (shape inspection and surface inspection) and production management (model and rod verification) of the tire 28 gripped in a deformation reducing manner. As a result, the inspection accuracy can be improved.

Additionally, the method of controlling the tire gripping device 16 of the present embodiment, for example, includes the steps of centering, temporary fixing, expanding, and gripping. In the centering step, for example, the main portions 78 are brought into contact with the end portion in the tire radial direction of the bead portion 102, and with the main portions 78 being in a state of allowing for relative movement with the end portion in the tire radial direction, the tire 28 is moved outward in the radial direction thereof to the first expanded diameter position, and centering of the tire 28 is executed by the chuck mechanism. In the temporary fixing step, relative movement of the main portions 78 and the end portion in the tire radial direction is completed, and the contact members 26 are temporarily fixed to the end portion in the tire radial direction. In the expanding step, for example, the pair of chuck portion bodies 38 are moved outward in the width direction of the tire 28, and the inner end portion in the tire width direction are spread outward in the width direction of the tire 28 at the flange portions 80. In the gripping step, for example, the contact members 26 are moved from the first expanded diameter position to the second expanded diameter position with a larger diameter, and the tire 28 is gripped with a predetermined gripping force. According to this embodiment, for example, the gripping under pressure of the tire 28 in the radial direction suppresses deformation of the tire 28. Furthermore, the shape of the tire 28 can be smoothly stabilized (corrected) by the expansion in the width direction of the tire 28.

Additionally, in the centering step of the method of controlling the tire gripping device 16 of the present embodiment, for example, the first contact members 74 (74*a*) that constitute the contact members 26 may be brought into contact with the end portion in the tire radial direction in a state of allowing for relative movement via rotation or sliding, and centering of the tire 28 may be executed. According to this embodiment, for example, stress concentration at a portion of the bead portion 102 of the tire 28 can be prevented. As a result, deformation of the tire 28 can be prevented when the tire 28 is gripped.

Additionally, in the temporary fixing step of the method of controlling the tire gripping device 16 of the present embodiment, for example, the second contact members 76 (76*a*) that constitute the contact members 26 may be brought into contact with the end portion in the tire radial direction in a state of non-relative movement, and the contact members 26 may be temporarily fixed to the end portion in the tire radial direction. According to this embodiment, for example, the orientation of the centered tire 28 can be maintained. In other words, maintaining the accuracy of the centering is simplified.

Additionally, in the gripping step of the method of controlling the tire gripping device 16 of the present embodiment, for example, after expanding the contact members 26 to the third expanded diameter position, which has a larger diameter than the second expanded diameter position, for providing a predetermined gripping force, the contact members 26 may be moved to the second expanded diameter position to provide a predetermined gripping force. According to this embodiment, by expanding the contact members 26 to the third expanded diameter position once and then retracting them to the second expanded diameter position, variation in the gripping force can be removed, and the required predetermined gripping force can be stabilized.

Additionally, in the centering step and/or the gripping step of the method of controlling the tire gripping device 16 of the present embodiment, for example, the expanding/retracting of the contact members 26 may be controlled on the basis of control torque of the drive source that moves the contact members 26 or the movement amount of the contact members 26. According to this embodiment, for example, retraction can be controlled easily and with high accuracy.

Additionally, in the expanding step of the method of controlling the tire gripping device 16 of the present embodiment, for example, the inner end portion in the tire width direction may be accommodated in and fixed to the recess portion (tapered portion 78a, small diameter portion 78b) formed in the main portion 78 on the side where the flange portion 80 is connected. According to this embodiment, for example, the bead portion 102 of the tire 28 can be smoothly and stably gripped.

Additionally, in the centering step and the expanding step of the method of controlling the tire gripping device 16 of the present embodiment, for example, movement of the pair of chuck portion bodies 38 in the tire width direction relative to the horizontally placed tire 28 may be executed and adjustment of the contact position may be executed. According to the present embodiment, the movement control of the chuck portion bodies 38 can be executed with high accuracy using the placement surface of the tire 28 (conveying surface of the stopping station 14) as a reference.

Additionally, a tire inspection method includes the tire gripping device 16 described above, the imaging portion for capturing a tire image that includes at least the side surface of the tire 28, and an inspection portion for executing an inspection of the surface of the tire 28 on the basis of the tire image. According to this embodiment, a process can be executed for quality control (shape inspection and surface inspection) and production management (model and rod verification) of the tire 28 gripped in a deformation reducing manner. As a result, the inspection accuracy can be improved.

Note that the control of the steps described above is executed in accordance with a computer-executable program stored in a storage portion such as a ROM included in the control console (control portion) 1000. Additionally, the program may be stored on a computer-readable recording media such as a CD-ROM, DVD, or magnetic disk with an installable or executable format.

The embodiments of the present technology described herein are merely examples. For the embodiments, various other modes can be implemented, and various omissions, substitutions, combinations, and changes that do not depart from the spirit of the technology can be made. Additionally, the configuration and shape of the embodiments can in part be replaced with other configurations and shapes. Furthermore, the specifications of the configurations and shapes (structure, type, direction, angle, shape, size, length, width, thickness, height, number, arrangement, position, material) can be changed as appropriate.

The invention claimed is:

1. A tire gripping device, comprising:
   a chuck mechanism that comprises a pair of chuck portions adjacent in a width direction of a tire and a plurality of contact members disposed on each of the chuck portions in a circumferential manner, each of the plurality of contact members being able to be brought into contact with an open end portion of a bead portion of the tire, and entering a state of allowing for relative movement with a contact surface of the open end portion in a first contact stage and entering a state of non-relative movement with the contact surface in a second contact stage subsequent to the first contact stage; and
   a driving mechanism that comprises a first driving mechanism for moving the plurality of contact members in a radial direction of the tire and a second driving mechanism for moving the pair of chuck portions in the width direction of the tire;
   wherein each of the plurality of contact members comprise a first contact member that is brought into contact with and enters the state of allowing for relative movement with the contact surface in the first contact stage and a second contact member that is brought into contact with and enters the state of non-relative movement with the contact surface in the second contact stage subsequent to the first contact stage and the first contact member and the second contact member contact with one end surface of the open end portions from a same direction in the radial direction of the tire, the end surface of the open end portions being defined as a surface of the bead portion from a bead heel to a bead toe.

2. The tire gripping device according to claim 1, wherein the first contact member and the second contact member are supported on a swinging member, and the swinging member is able to adopt a first orientation in which the first contact member is brought into contact with the contact surface before the second contact member and adopt a second orientation in which the second contact member is brought into contact with the contact surface.

3. The tire gripping device according to claim 2, wherein the first contact member comprises a self-rotation mechanism for entering the state of allowing for relative movement.

4. The tire gripping device according to claim 3, wherein a side surface of the first contact member is processed to reduce smoothness of the side surface, wherein the side surface of the first contact member is configured to be brought into contact with the bead portion of the tire.

5. The tire gripping device according to claim 4, wherein the plurality of contact members each comprise a main portion that is brought into contact with the end portion of the bead portion in the radial direction of the tire and a flange portion connected to the main portion that is brought into contact with an inner end portion of the bead portion in the width direction of the tire.

6. The tire gripping device according to claim 5, wherein the main portion comprises a recess portion for accommodating the end portion in the radial direction of the tire, disposed in an end portion region on a side where the flange portion is connected.

7. The tire gripping device according to claim 6, wherein a surface of the main portion is treated for reflection suppression.

8. The tire gripping device according to claim 2, wherein the first contact member comprises a surface portion that has a lower static friction coefficient than a surface portion of the second contact member.

9. The tire gripping device according to claim 8, wherein the driving mechanism comprises a clutch portion that switches between a gripping power transmission state in which power from a power source is transmitted to power the plurality of contact members to grip the tire and a rotation power transmission state in which the power from the power source is transmitted to power rotation of the tire about a rotation axis with the tire in an orientation in which the tire is gripped by the plurality of contact members.

10. The tire gripping device according to claim 1, wherein the first contact member comprises a self-rotation mechanism for entering the state of allowing for relative movement.

11. The tire gripping device according to claim 10, wherein a side surface of the first contact member is processed to reduce smoothness of the side surface, wherein the side surface of the first contact member is configured to be brought into contact with the bead portion of the tire.

12. The tire gripping device according to claim 1, wherein the plurality of contact members each comprise a main portion that is brought into contact with the end portion of the bead portion in the radial direction of the tire and a flange portion connected to the main portion that is brought into contact with an inner end portion of the bead portion in the width direction of the tire.

13. The tire gripping device according to claim 12, wherein the main portion comprises a recess portion for accommodating the end portion in the radial direction of the tire, disposed in an end portion region on a side where the flange portion is connected.

14. The tire gripping device according to claim 12, wherein a surface of the main portion is treated for reflection suppression.

15. The tire gripping device according to claim 1, wherein the first contact member comprises a surface portion that has a lower static friction coefficient than a surface portion of the second contact member.

16. The tire gripping device according to claim 15, wherein the first contact member and the second contact member are on a same chuck portion.

17. The tire gripping device according to claim 1, wherein the driving mechanism comprises a clutch portion that switches between a gripping power transmission state in which power from a power source is transmitted to power the plurality of contact members to grip the tire and a rotation power transmission state in which the power from the power source is transmitted to power rotation of the tire about a rotation axis with the tire in an orientation in which the tire is gripped by the plurality of contact members.

18. A tire inspection device, comprising:
the tire gripping device described in claim 1;
an imaging portion for capturing a tire image containing at least a side surface of a tire; and
an inspection portion for executing surface inspection of the tire on a basis of the tire image.

19. A tire gripping device, comprising:
a chuck mechanism that comprises a pair of chuck portions adjacent in a width direction of a tire and a plurality of contact members disposed on each of the chuck portions in a circumferential manner, each of the plurality of contact members being able to be brought into contact with an open end portion of a bead portion of the tire, and entering a state of allowing for relative movement with a contact surface of the open end portion in a first contact stage and entering a state of non-relative movement with the contact surface in a second contact stage subsequent to the first contact stage; and
a driving mechanism that comprises a first driving mechanism for moving the plurality of contact members in a radial direction of the tire and a second driving mechanism for moving the pair of chuck portions in the width direction of the tire; wherein:
each of the plurality of contact members comprise a first contact member that is brought into contact with and enters the state of allowing for relative movement with the contact surface in the first contact stage and a second contact member that is brought into contact with and enters the state of non-relative movement with the contact surface in the second contact stage subsequent to the first contact stage and the first contact member and the second contact member contact with one end surface of the open end portions in a same direction, the end surface of the open end portions being defined as a surface of the bead portion from a bead heel to a bead toe;
the first contact member and the second contact member are supported on a swinging member, and the swinging member is able to adopt a first orientation in which the first contact member is brought into contact with the contact surface before the second contact member and adopt a second orientation in which the second contact member is brought into contact with the contact surface;
the first contact member comprises a self-rotation mechanism for entering the state of allowing for relative movement, the self-rotation mechanism being rotatable about a rotation shaft fixed to the swinging member; and
the second contact member is fixed to the swinging member in a non-rotatable manner.

20. A tire gripping device, comprising:
a chuck mechanism that comprises a pair of chuck portions adjacent in a width direction of a tire and a plurality of contact members disposed on each of the chuck portions in a circumferential manner, each of the plurality of contact members being able to be brought into contact with an open end portion of a bead portion of the tire, and entering a state of allowing for relative movement with a contact surface of the open end portion in a first contact stage and entering a state of non-relative movement with the contact surface in a second contact stage subsequent to the first contact stage; and
a driving mechanism that comprises a first driving mechanism for moving the plurality of contact members in a radial direction of the tire and a second driving mechanism for moving the pair of chuck portions in the width direction of the tire; wherein:
each of the plurality of contact members comprise a first contact member that is brought into contact with and enters the state of allowing for relative movement with the contact surface in the first contact stage and a second contact member that is brought into contact with and enters the state of non-relative movement with the contact surface in the second contact stage subsequent to the first contact stage and the first contact member and the second contact member contact with one end surface of the open end portions in a same direction, the end surface of the open end portions being defined as a surface of the bead portion from a bead heel to a bead toe; and the plurality of contact members each comprise a main portion that is brought into contact with the end surface of the open end portion of the bead portion from the radial direction of the tire and a flange portion connected to the main portion that is brought into contact with the bead toe of the bead portion from the width direction of the tire.

\* \* \* \* \*